United States Patent
Watkins

(10) Patent No.: US 7,080,671 B2
(45) Date of Patent: Jul. 25, 2006

(54) REPLACEMENT VEHICLE FUEL INTAKE DEVICE

(75) Inventor: Kirk W. Watkins, Alpharetta, GA (US)

(73) Assignee: Paraphase, Inc., Atlanta, GA (US)

( * ) Notice: Subject to any disclaimer, the term of this patent is extended or adjusted under 35 U.S.C. 154(b) by 342 days.

(21) Appl. No.: 10/634,019

(22) Filed: Aug. 4, 2003

(65) Prior Publication Data

US 2005/0034776 A1 Feb. 17, 2005

Related U.S. Application Data

(63) Continuation-in-part of application No. 10/609,177, filed on Jun. 26, 2003.

(60) Provisional application No. 60/434,148, filed on Dec. 17, 2002, provisional application No. 60/449,690, filed on Feb. 24, 2003, provisional application No. 60/457,537, filed on Mar. 25, 2003.

(51) Int. Cl.
*B65B 1/04* (2006.01)

(52) U.S. Cl. .................... 141/350; 141/349; 141/59

(58) Field of Classification Search .............. 141/2, 141/59, 285, 301, 302, 312, 346–351; 220/86.2
See application file for complete search history.

(56) References Cited

U.S. PATENT DOCUMENTS

| | | | |
|---|---|---|---|
| 4,140,160 A | 2/1979 | Glackin | 141/332 |
| 4,703,867 A | 11/1987 | Schoenhard | 220/85 F |
| 4,896,746 A | 1/1990 | Desjardins | 184/92 |
| 5,101,869 A | 4/1992 | Myers | 141/339 |
| 5,228,488 A | 7/1993 | Fletcher | 141/331 |
| 5,316,059 A | 5/1994 | Lahnan et al. | 141/340 |
| 5,349,995 A | 9/1994 | Perez | 141/98 |
| 5,472,025 A | 12/1995 | Conrad et al. | 141/332 |
| 5,547,099 A | 8/1996 | Chang | 220/212.5 |
| 5,658,036 A * | 8/1997 | Benoist | 296/97.22 |
| 5,685,351 A | 11/1997 | Kazarian et al. | 141/325 |
| 5,931,206 A | 8/1999 | Simdon et al. | 141/312 |
| 6,230,768 B1 | 5/2001 | Stapf et al. | |
| 6,539,990 B1 * | 4/2003 | Levey et al. | 141/301 |
| 2003/0075240 A1 | 4/2003 | Watkins | 141/331 |

OTHER PUBLICATIONS

The Gas Cap: More Important Than you Think—Service Technicians Society.
Ram Products Limited—Products & Services—2 page brochure 1997.
Ram Products Limited—The Gas Cap—2 page brochure 1997.

(Continued)

*Primary Examiner*—Timothy L. Maust
(74) *Attorney, Agent, or Firm*—Womble Carlyle Sandridge & Rice, PLLC

(57) ABSTRACT

A replacement fuel intake device is provided that is removably mountable within a base portion of a vehicle and contains a housing that is pivotal from a closed position to an open position. While in the closed position, the fuel intake passage to the fuel tank is sealed. While in the open position, the fuel intake passage is able to receive fuel from a fuel nozzle. The fuel intake device can be combined with a condensation capture apparatus that provides multiple coils in communication with a fume tube. The coils are cooled during fueling by the fuel passing around them from their placement inside the fuel intake pipe and act to condense fuel fumes into fuel for return to the fuel tank as the fumes rise toward the fume tube. The replacement fuel intake device can also include a pressurization and depressurization valve.

28 Claims, 20 Drawing Sheets

OTHER PUBLICATIONS

New & Improved PermaCap—The Permanent Gas Cap—2 page brochure.

New & Improved PermaCap—"It is too good to be true . . ."—1 page brochure.

New & Improved PermaCap—"You can actually fill your tank without ever removing your gas cap . . . "—2 page brochure.

* cited by examiner

REPLACEMENT VEHICLE FUEL INTAKE DEVICE

CROSS REFERENCE TO RELATED APPLICATIONS

This application is a continuation-in-part of, and claims priority to, U.S. Pat. application Ser. No. 10/609,177, filed Jun. 26, 2003, which claims priority to U.S. Provisional Application No. 60/434,148, filed Dec. 17, 2002, U.S. Provisional Application No. 60/449,690, filed Feb. 24, 2003, and U.S. Provisional Application No. 60/457,537, filed Mar. 25, 2003; all of which are incorporated herein by reference.

FIELD OF THE INVENTION

The present invention generally relates to automotive accessories, and more particularly to a replacement vehicle fuel intake device for opening and closing a fuel intake passage for a vehicle that eliminates the need for a removable gas cap.

BACKGROUND OF THE INVENTION

Typically, to pump gas into most cars, boats or other vehicles, the operator generally must remove a locking seal cap covering a fuel intake passage to open the intake passage for entry of a fuel nozzle therein. The opening of the gas intake pipe cover and the subsequent removal of the fuel cap is a two-step process that is not as convenient or as efficient as merely opening the cover and inserting the gasoline hose. Often, especially with many older cars, the operator must either hold on to the cap or lay it down on top of the car or somewhere else close to the vehicle while they pump the gas. A problem with this is that often times after pumping the gas, especially in inclement weather, the operator will forget to retrieve and replace the cap over the gas intake, often simply driving off and leaving the cap or having it roll away to become lost or destroyed. As a result, the gas intake for the car is left unsealed, enabling release of gasoline vapors and potential introduction of contaminants into the fuel tank, and the owner/operator must go to either the dealership or a specialty automotive store to find a gas cap of the particular size and configuration required for his or her vehicle.

More recently, vehicle gas caps have begun to be equipped with a tether or strap, which allows the caps to simply hang or swing down below the fuel intake. The edges of the caps, however, can scratch the vehicle finish when allowed to drop or swing down, and if the straps become broken, the caps still can be lost. Another problem is that over time the fuel caps typically become covered with grease, fuel, dirt and dust and thus become somewhat messy and unsanitary to remove.

Additionally, on average, there are over 16,000,000 vehicles sold in the United States every year and over 200,000,000 total vehicles on the road. Over the course of a year, it has been estimated that vehicles lose as much as 150,000,000 gallons of fuel a year because of a damaged or missing fuel cap. It is further estimated that upwards of over 200,000,000 gallons of fuel are lost every year through the forcing out of fumes of fuel that are in the fuel tank during the filling of the tank. These fumes are forced out of the fuel tank because the tank is a closed system that exchanges the fuel tank fumes with fuel during filling and draws those replaced fumes out of the tank into the recapture system of the fueling station. These escaping fumes are both a safety and environmental hazard. Fueling stations have been the site of numerous explosions caused by escaping fumes from fuel tanks. Additionally, the fumes aspirate the air and create environmental hazards in the air for humans, plants, and animals.

It can therefore be seen that a need exists for an automobile fuel intake device that addresses these and other related and unrelated problems in the art.

SUMMARY OF THE INVENTION

A fuel intake device is provided that presents a pivotally mounted body moveable between an open position and a closed position. When the fuel intake device is in the open position, an intake opening is provided that communicates with a fuel intake passage of the vehicle. When the fuel intake device is in its closed position, the fuel intake passage is sealed to prevent access or escape therefrom of the fuel. In the closed position, a pressurization/depressurization valve can be positioned over the fuel intake passage (as either a fixed or removable part of the device). A locking system can also be provided to provide additional security for the fuel intake device while in the closed position. The locking system could include a lock for the outer cover and/or for the fuel intake device. The fuel intake device lock/locks could restrict the device from untwisting and from flipping to the open position.

A system and method for recovering escaping fumes from the fuel tank of a vehicle is also provided. This system and method works either in coordination with the fuel intake device as described herein or can be mounted within a traditional fuel tank to condense the fumes into fuel to be retained and used in the vehicle. The condensation system generally includes multiple coils in communication with a fume tube aligned along the fuel intake pipe. The coils have intake holes at their base that receive fumes rising to the top of the fuel tank. The coils spiral through the fuel intake pipe and dispense any fumes that are not condensed during travel through the coils into the fume tube. The fume tube can be in communication with the fuel intake device described above to discharge the fumes into the receiving jacket of the fuel nozzle provided for receipt of such fumes. In addition, the coils are cooled during a fueling operation by the passage of the liquid fuel through the fuel intake pipe about which the coils are extended and act to condense the fumes into liquid, condensed fuel as the fumes rise upwardly through the intake pipe toward the fume tube. The condensed fuel will then drain down the coils into the fuel tank to be used by the vehicle. Alternatively, or in addition to the cooling from the fuel flow, the coils can be cooled by connection to the air conditioning unit of the vehicle or by some other method.

A replacement fuel intake device is also provided that presents a body portion that contains a pivotal housing moveable between an open and a closed position. The replacement fuel intake device can be inserted into the fuel intake pipe of the vehicle through a pipe fitting extension of the body portion. The pipe fitting extension can be threaded or force fit into or onto the fuel intake pipe to receive a fuel flow from a fuel nozzle into the tank of the vehicle.

DESCRIPTION OF THE INVENTION

Figure 1:
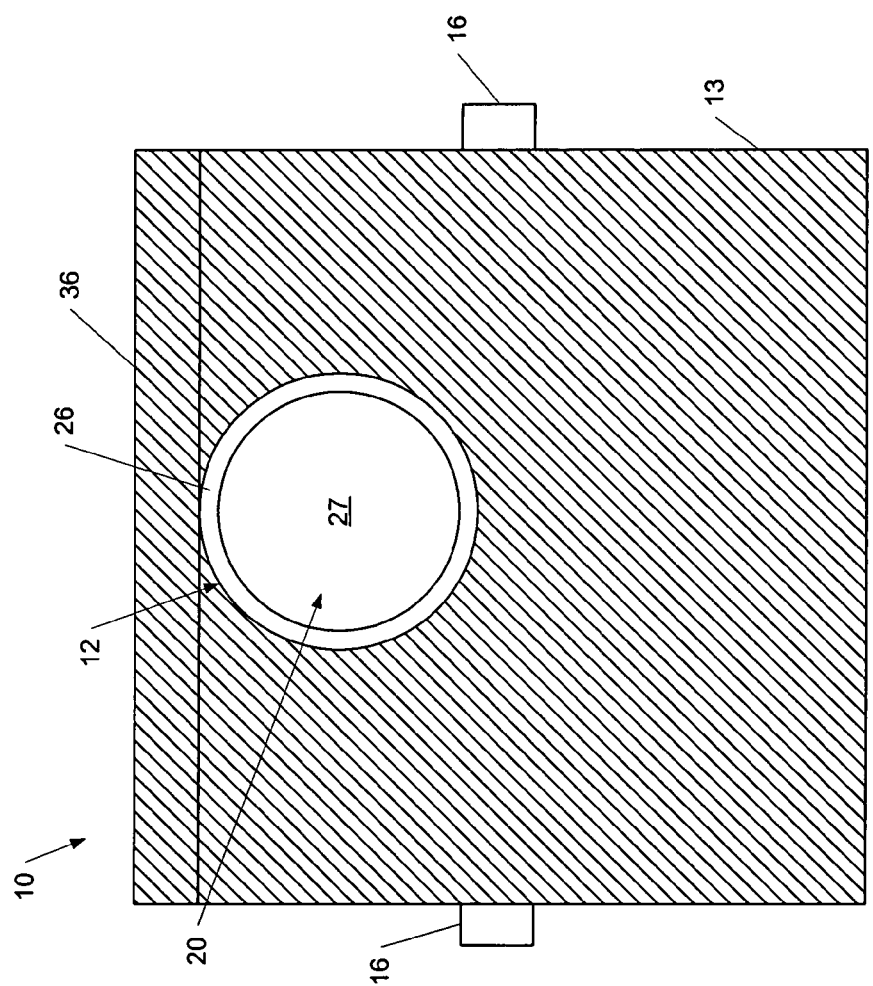
FIG. 1 is a top plan view of a vehicle intake device of the present invention.
Figure 2:
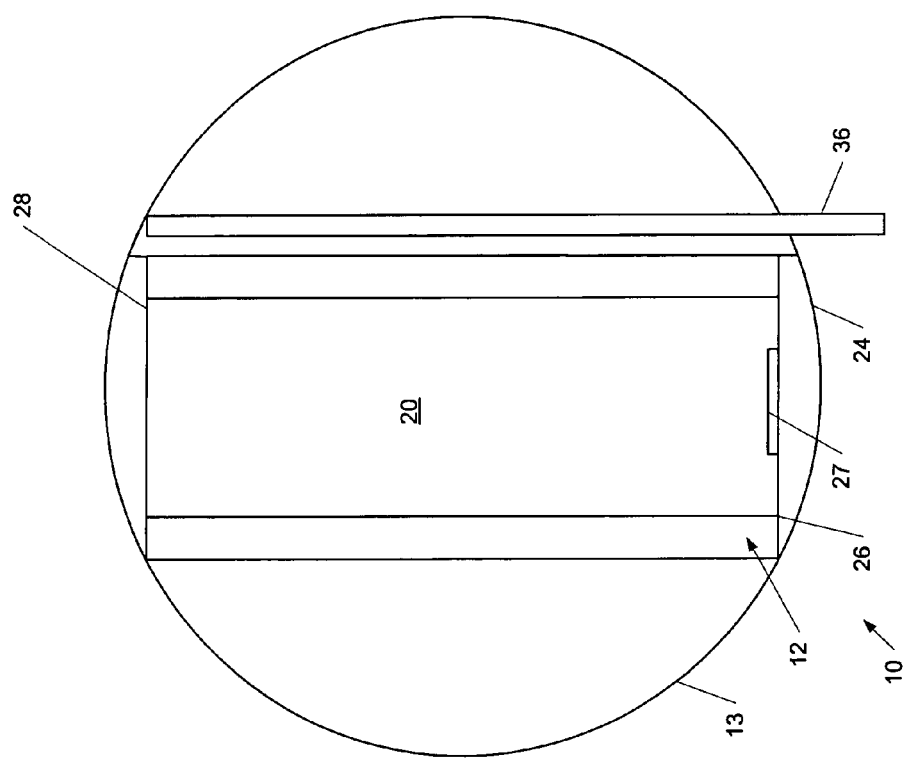
FIG. 2 is a cross-sectional view of the vehicle fuel intake device in a closed position.
Figure 3:
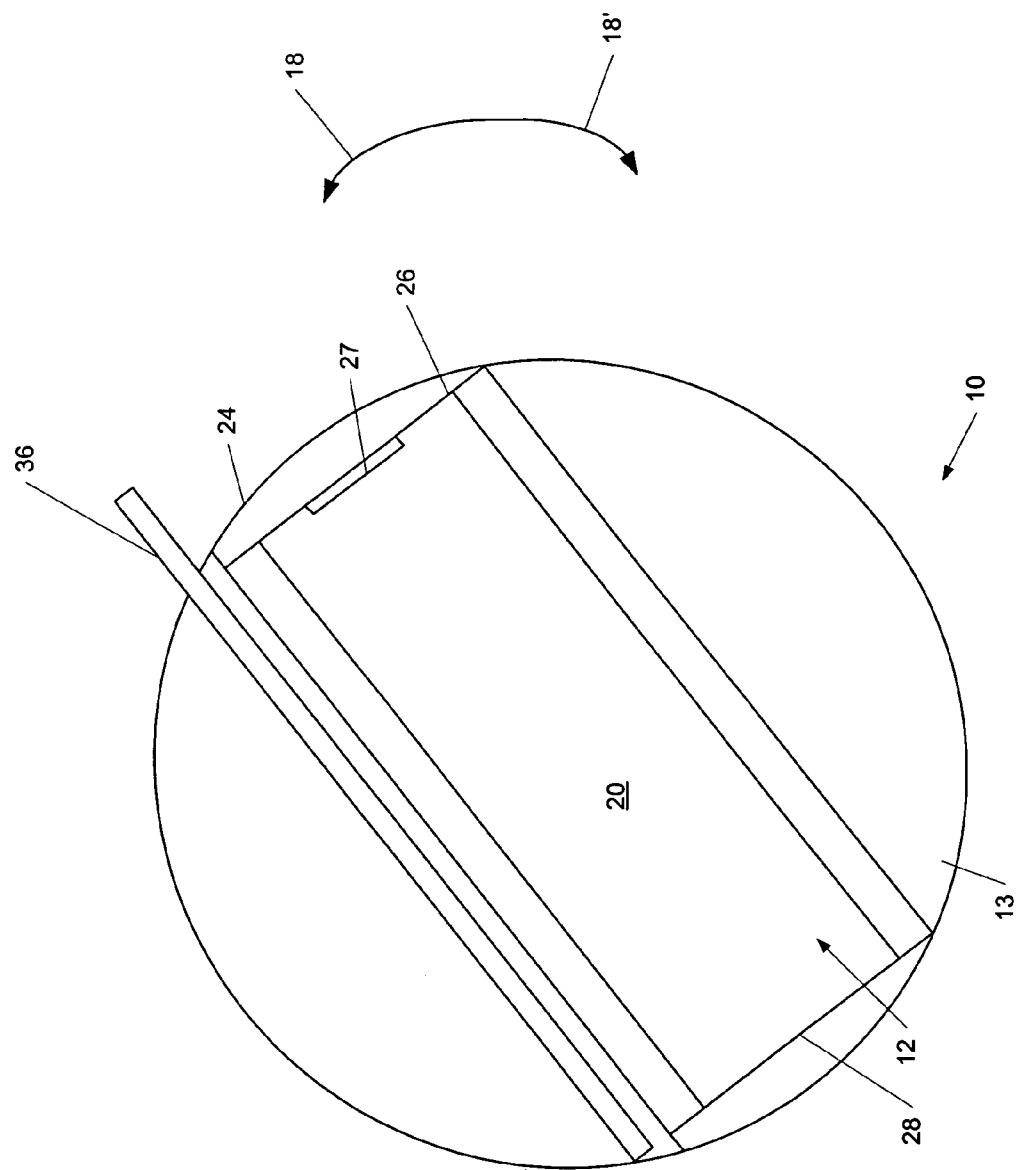
FIG. 3 is a cross-sectional view of the fuel intake device rotated to an open position.
Figure 4B:
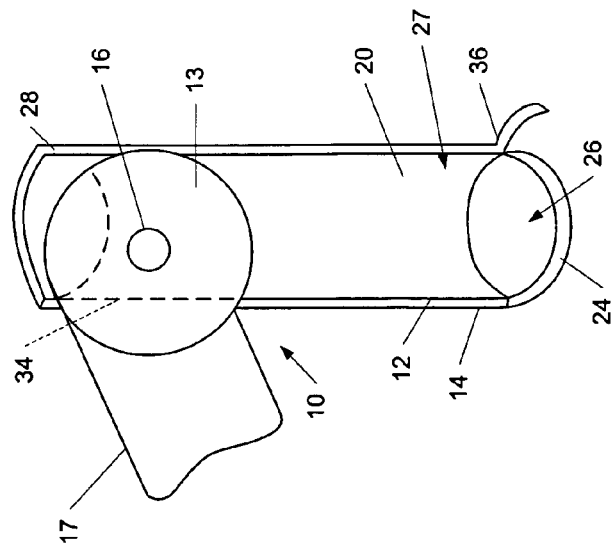
FIG. 4B is a side view schematically illustrating the fuel intake device of FIG. 4A in a closed position with a valve between the vehicle fuel intake passage being closed.
Figure 4A:
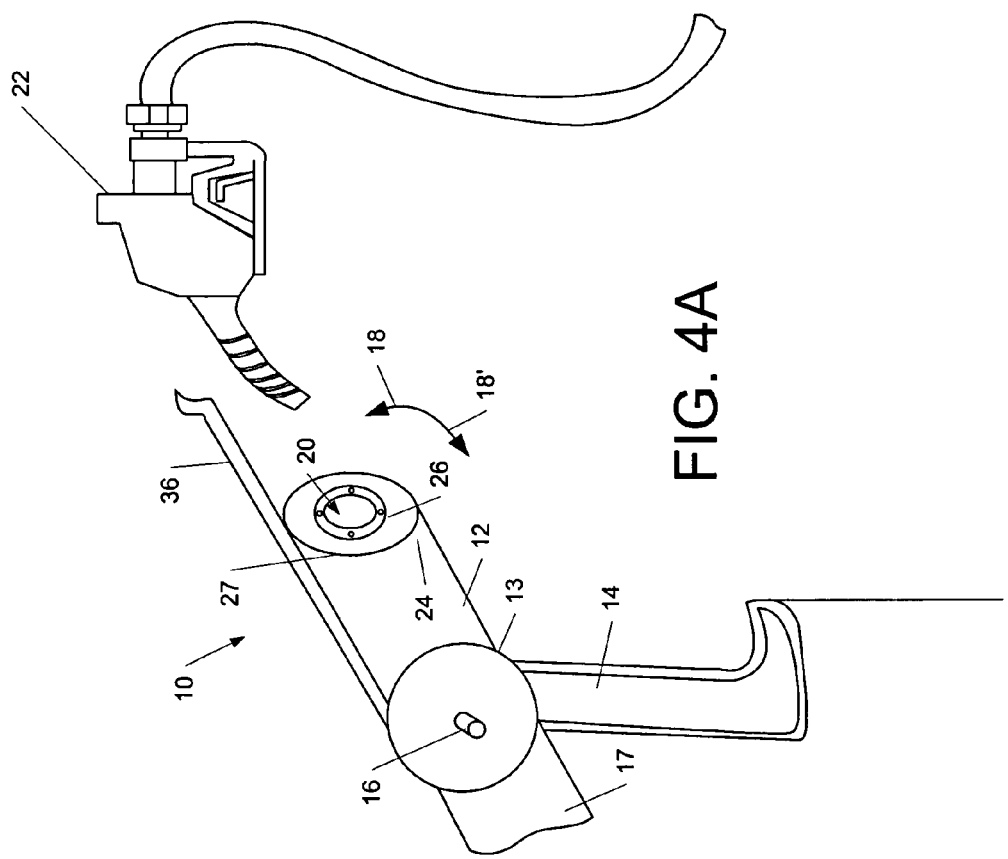
FIG. 4A is a perspective illustration schematically illustrating an alternative design of the fuel intake device in an open position for receiving a fuel nozzle of a gas pump.

The present invention generally comprises a fuel intake device 10 for a fuel intake system of a vehicle such as an automobile, boat, etc. As shown in the attached drawings, FIGS. 1–4B, the fuel intake device 10 generally includes a cylindrical or tubular intake body or pipe 12, generally formed from a metal material such as aluminum or other types of corrosion resistant material such as various synthetics or plastic materials. As shown in FIGS. 1–3, the pipe 12 generally is cylindrical, although other shapes and configurations also can be used, and typically is mounted within a larger cylindrical base portion 13 that will be pivotally mounted within a recess or well 14 (FIGS. 1 and 4A) of a vehicle, by a pivot pin or rod 16. Alternatively, as shown in FIGS. 4A and 4B, the base 13 can be of a reduced size sufficient to support the intake pipe 12 so as to define a valve between the intake pipe 12 and a vehicle fuel inlet pipe 17. As a result, the intake pipe 12 of the fuel intake device 10 is enabled to pivot from a closed position, as shown in FIGS. 2 and 4B, to an open position as illustrated in FIGS. 1, 3 and 4A, by being rotated in the direction of arrows 18 and 18' (FIGS. 3 and 4A).

As indicated in FIGS. 1–4B, the intake pipe or body 12 of the fuel intake device 10 defines an intake or flow passage 20, through which fuel can be pumped from a fuel pump nozzle 22, as indicated in FIG. 4A. In addition, the intake pipe 12 generally includes a forward or proximal end 24 having an intake opening 26 that generally includes a biased closure element 27 (FIGS. 3 and 4A) as is commonly included with the fuel intakes for most vehicles. The intake pipe further includes a distal end 28 (FIG. 4B) that communicates with a proximal end 34 of the fuel inlet pipe 17 of the vehicle so as to define a reclosable valve between the proximal and distal ends of the intake pipe 12 and vehicle fuel inlet pipe 17, respectively.

When the intake pipe 12 of the fuel intake device 10 is pivoted in the direction of arrow 18 to its open position shown in FIGS. 3 and 4A, the internal valve 15 within the cylindrical base 13 is opened so that the fuel intake or flow passage 20 through the intake pipe 12 is in open communication with the passage of the vehicle fuel inlet pipe 17 to allow fuel to be pumped therethrough. Once a fueling operation has been completed and the fuel pump nozzle 22 has been removed from the fuel flow passage 20 of the intake pipe 12, the fuel intake device can then be pivoted downwardly in the direction of arrow 18' (FIG. 4A) to move the body to its closed position whereupon the proximal and distal ends of the body and vehicle fuel inlet pipe 17, respectively, are moved out of registration so as to close off and substantially seal the passage therebetween, as indicated in FIG. 4B.

As further indicated in FIGS. 2–4B, a lid or cover 36, such as typically found on most vehicles, further generally will be provided attached to the base portion 13 (FIGS. 2–3) or to the intake pipe itself (FIGS. 4A–4B) of the fuel intake device 10 of the present invention, for enclosing the fuel intake well or recess 14 (FIG. 4A). When the fuel intake device is in its closed position as shown in FIG. 4B, the cover will be lowered to a closed and covering position, enclosing the recess 14. In addition, a lock (not shown) can be provided so as to secure the cover in a closed and locked position and prevent access to the fuel intake device and fuel inlet pipe of the vehicle when the fuel intake device is in its closed and locked position, which lock can be remotely actuated, such as by a button within the vehicle, or electronically for added security.

Figure 5:
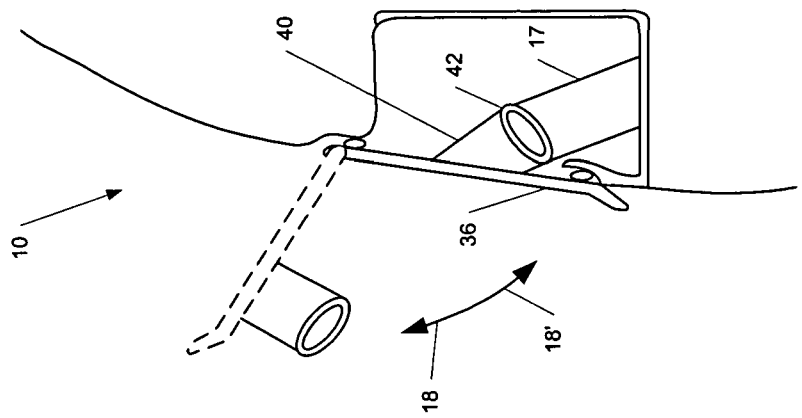
FIG. 5 is a side view illustrating an additional embodiment of the vehicle fuel intake device of the present invention.
Figure 6:
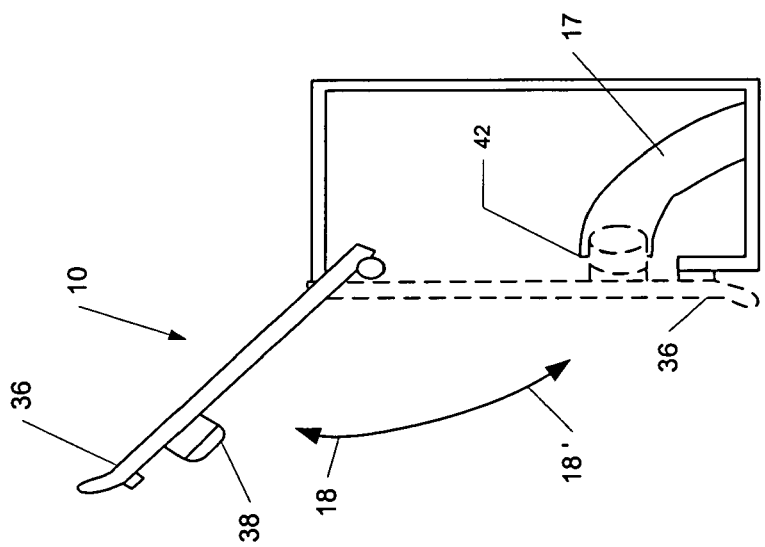
FIG. 6 is a side elevational view of another alternative design of the vehicle fuel intake device.

Still further alternative embodiments or designs of the fuel intake device 10 are illustrated in FIGS. 5 and 6. In each of these embodiments, the cover 36 includes a stopper 38 (FIG. 5) or a sleeve 40 adapted to engage and close/seal the open end 42 of the vehicle fuel inlet pipe 17. The stopper 38 (FIG. 5) and/or sleeve 40 (FIG. 6) can be formed from a flexible sealing material such as a rubber, plastic, or other corrosion-resistant, synthetic material that will either engage and fit within the opening 42 of the vehicle fuel inlet pipe 17 as indicated in FIG. 5, or alternatively, engage and fit over the open end 42 of the vehicle fuel inlet pipe 17 as shown in FIG. 6. Alternatively, the stopper 38 (FIG. 5) or sleeve 40 (FIG. 6) can be formed from a substantially rigid, corrosion resistant material and include a gasket or sealing ring formed from a sealing material such as rubber or other synthetic material, and which is adapted to engage and fit tightly about, mate to, or fit within the open end of the vehicle fuel inlet pipe to form a substantially air tight seal therebetween. As indicated in FIGS. 5 and 6, the cover can simply be pivoted in the direction of arrows 18 and 18' between its open and closed positions for unsealing and sealing the vehicle fuel inlet pipe.

Figure 7A:
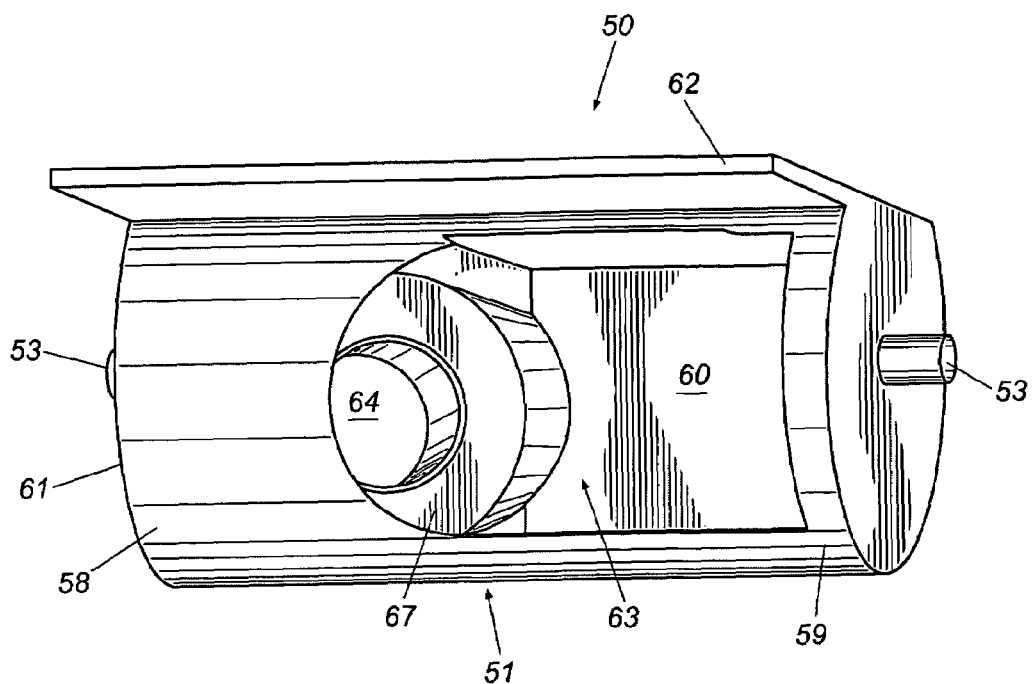
FIGS. 7A–7B are perspective views of still a further embodiment of the vehicle fuel intake device of the present invention.
Figure 7B:
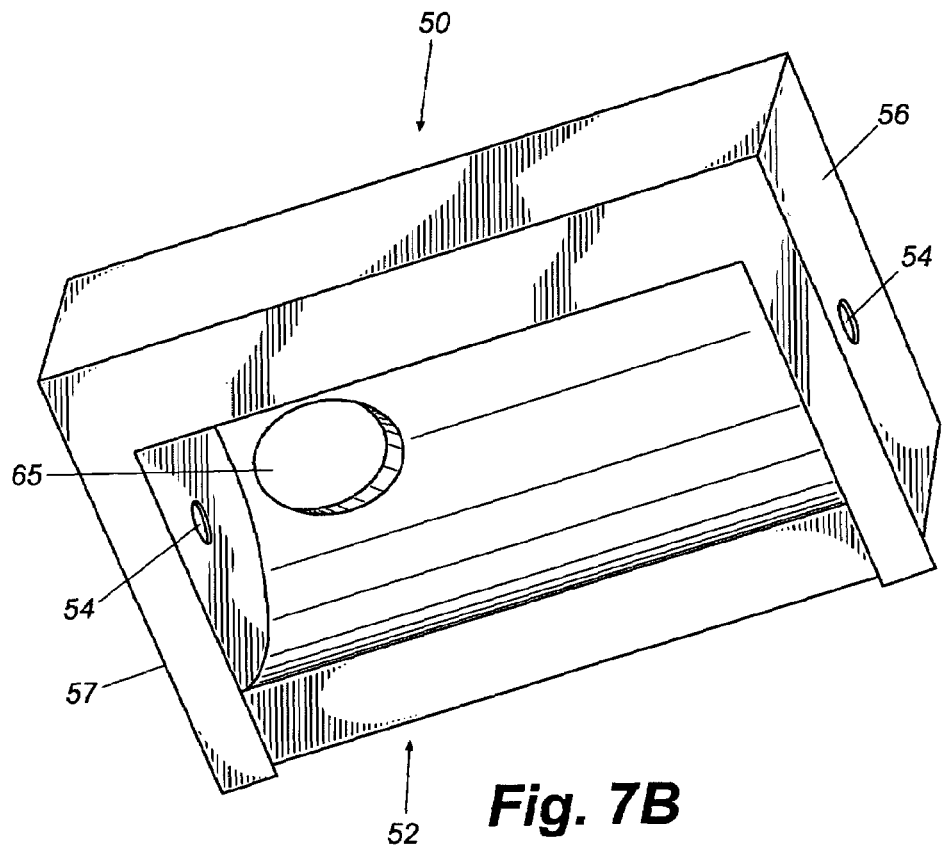
Figure 8A:
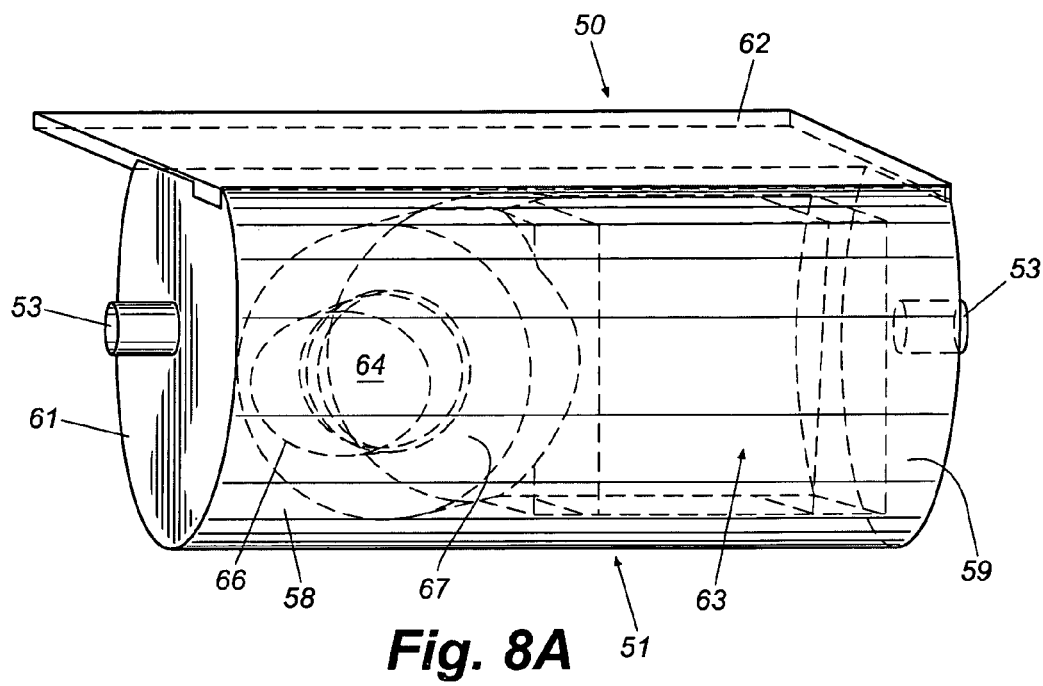
FIGS. 8A and 8B are perspective views of the embodiment of the vehicle fuel intake device of FIGS. 7A–7B, illustrated schematically with parts broken away.
Figure 8B:
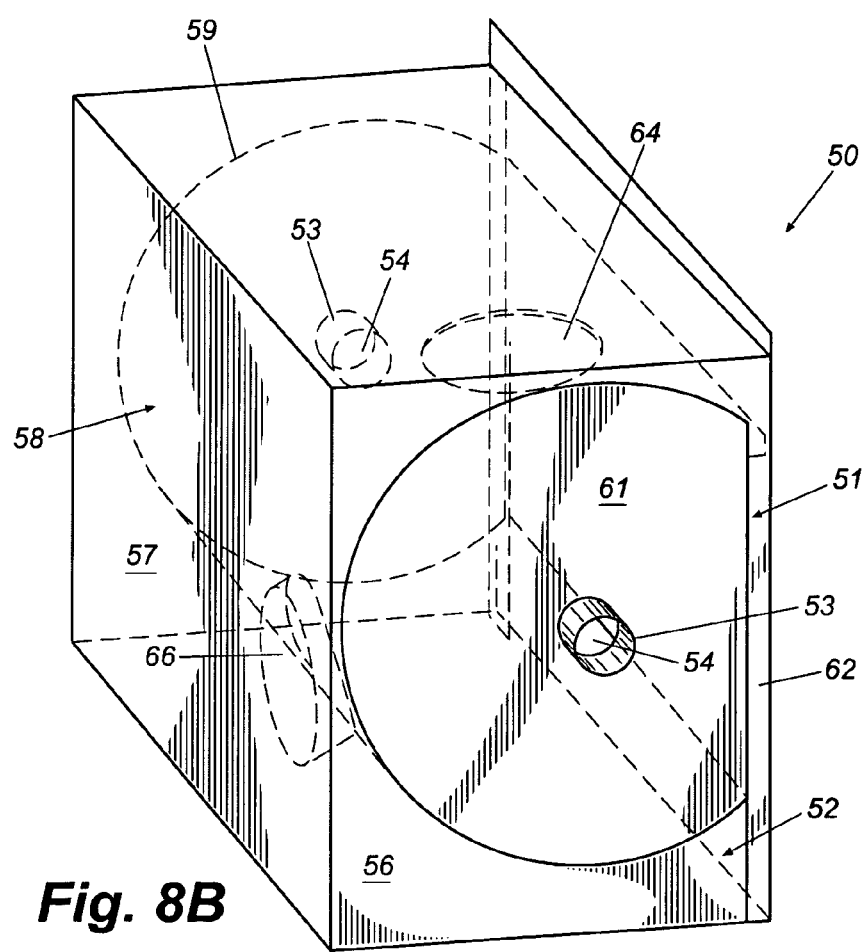

FIGS. 7A–8B illustrate yet a further embodiment of the fuel intake device 50. In this embodiment, the fuel intake device includes a body portion typically formed as a cylinder 51 (FIGS. 7A, 8A, and 8B) that is pivotally received within an inner housing or well 52 (FIGS. 7B and 8B) mounted within the vehicle. The cylinder 51 typically is pivotally attached to the housing by pins or axles 53 (FIG. 8B) received within openings 54 formed in the end walls 56 and 57 of the housing as indicated in FIG. 8B. As discussed above, the cylinder 51 can be formed from a durable, lightweight, corrosion resistant material such as aluminum, steel or other metals, or can be formed from a synthetic material such as various plastics, and typically is approximately 3–4 inches in diameter, although other size cylinders can be used sufficient to enable ease of access of the nozzle of the gasoline pump to fit therewithin, while at the same time enable the cylinder to easily rotate between an open, operative position and a closed, non-operative position.

As shown in FIGS. 7A and 8A, the cylinder 51 generally includes a body 58 having opposed ends 59 and 61 at which the hinge pins 53 are mounted, and a cover portion 62 formed or mounted along an upper side portion thereof. The cover portion 62 is adapted to close and seal the housing when the cylinder is in a non-operative, closed position, and can include a sealing material such as a rubberized or silicone gasket applied about the edge of the cover so as to form a substantially airtight seal with the edges of the housing. As indicated in FIGS. 7A and 8A, the cylinder body further includes a recessed or cut-away portion 63 having a nozzle passage or port 64 formed at one end thereof. As the cylinder is rotated with the raising of the lid, the nozzle port 64 is moved into registration or communication with an opening 65 in the inner housing 52 and the inlet end 66 (FIG. 8B) of the vehicle fuel inlet pipe.

The nozzle port or passage 64 generally has a diameter sufficient to facilitate the receipt of a gasoline nozzle or pipe and has an approximately ⅛–1/16 inch rim or seat 67 (FIG. 8A) formed about its upper end and which extends into the cut-away portion of the cylinder body to facilitate the seating of a sealing material or gasket of the gasoline nozzle to fit over and bear against the rim to prevent escape of gas vapors, etc. In addition, a gasket or sealing material also can be provided around the inlet end of the vehicle fuel pipe and/or about the bottom end of the nozzle port of the cylinder so that these ported openings are substantially sealed against air, water, and other debris or fluids flowing into the vehicle fuel inlet pipe when the cylinder is in its closed, non-operative position, such as indicated in FIG. 8B.

When the lid is opened, the cylinder is rotated upwardly until the portion extending below the cylinder will contact or engage the top opening of the housing, which will prevent further pivoting movement of the cylinder with its nozzle port or passage being aligned with the inlet opening of the vehicle fuel inlet pipe. At this point, the gasoline nozzle can be received within the nozzle port 64 (FIG. 7A, 8A) for input of fuel into the vehicle. Upon completion of the fueling operation, the nozzle will be removed and the lid closed, causing the cylinder 51 to be rotated to its non-operative position and closing off the inlet end of the fuel inlet pipe. In addition, a spring or similar biasing mechanism can be provided for urging or biasing the cylinder to its closed, non-operative position. The cylinder further can be locked in place, such as by conventional gas compartment locking mechanism that requires a remote access or opening or can simply be biased to its closed, locked position as desired. The cylinder can be oriented in any alignment desired, such as diagonal, though horizontal and vertical are envisioned to be typical.

Figure 9A:
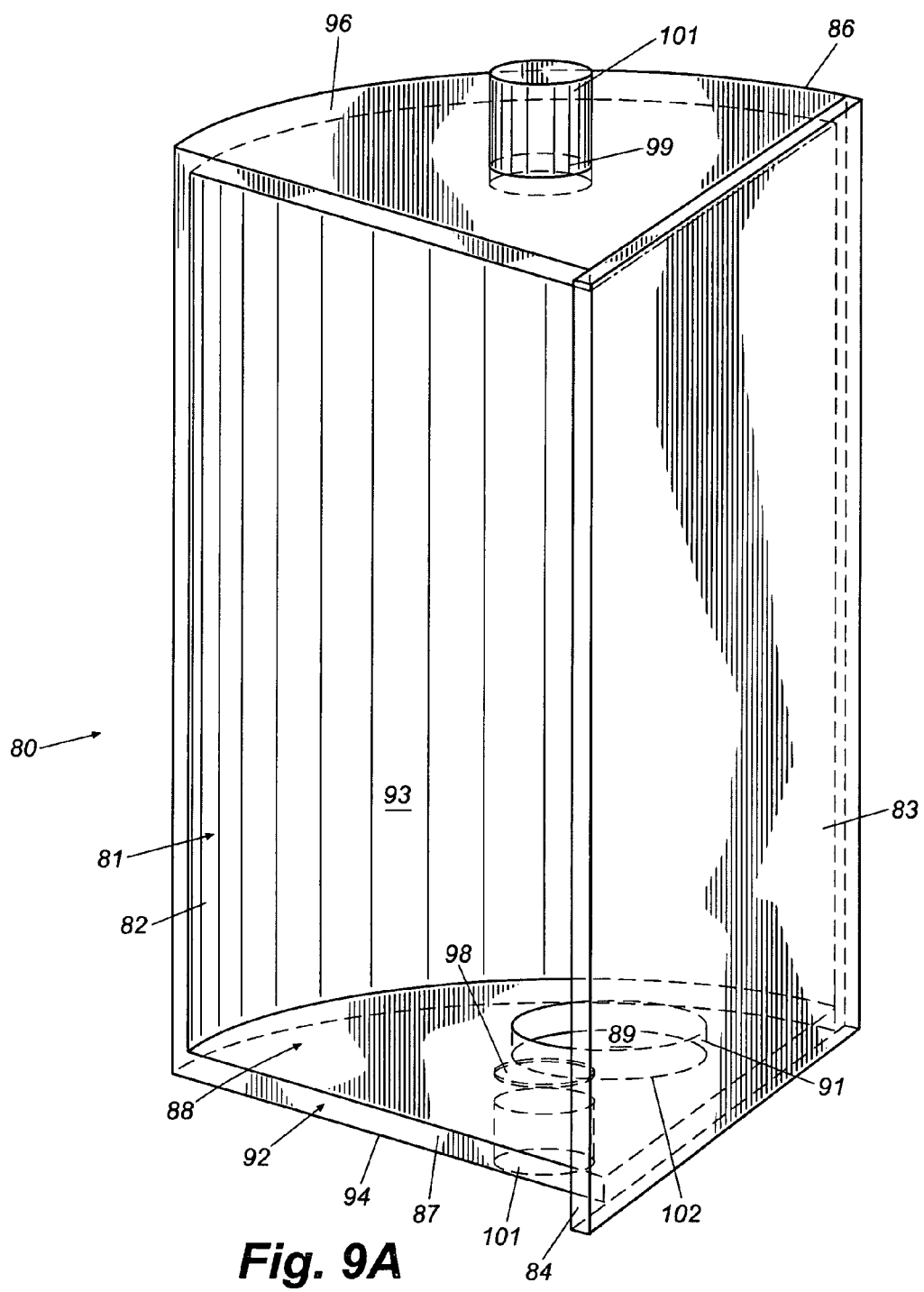
FIGS. 9A–9C are perspective illustrations of a further alternative embodiment of the vehicle fuel intake device.
Figure 9B:
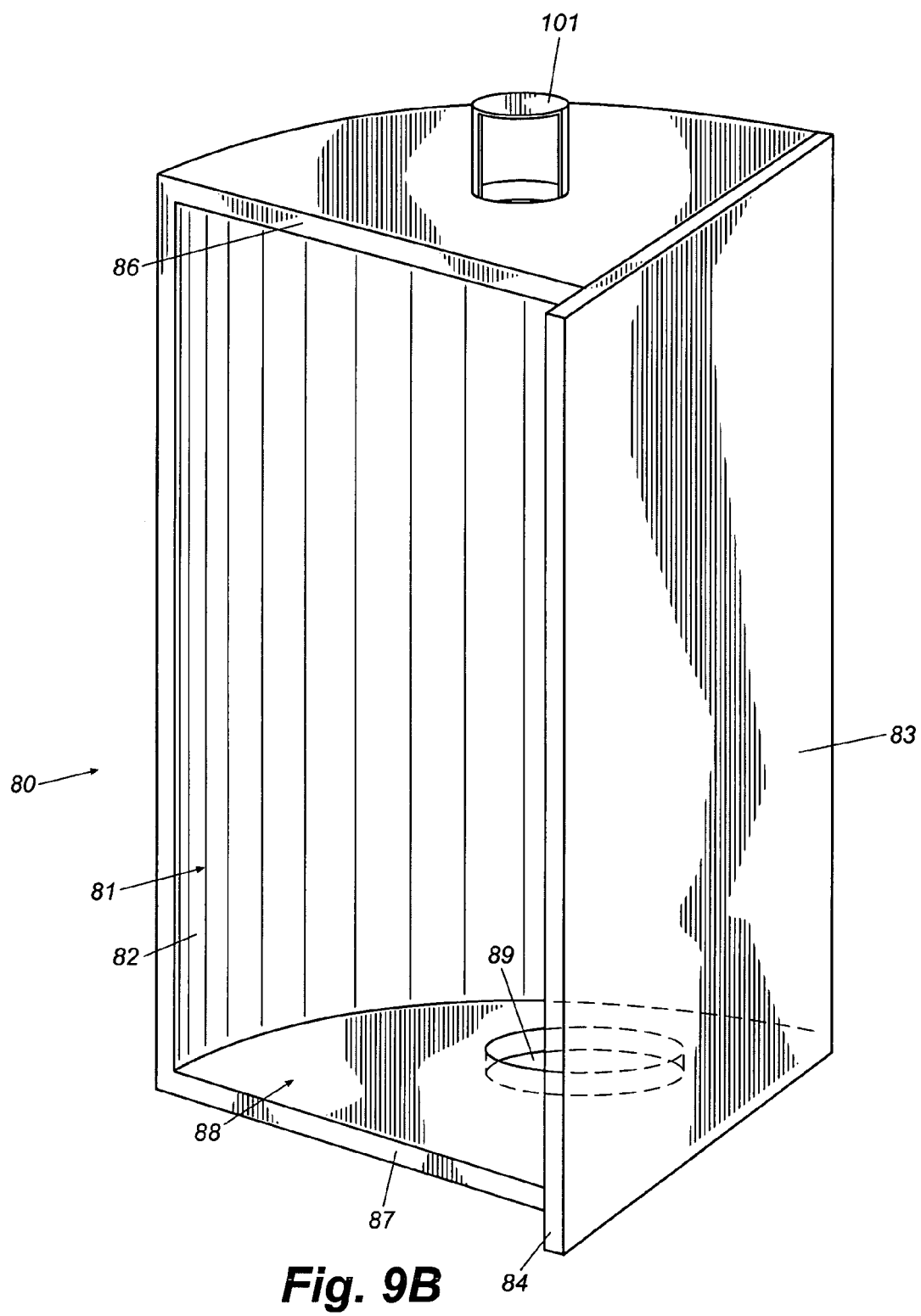
Figure 9C:
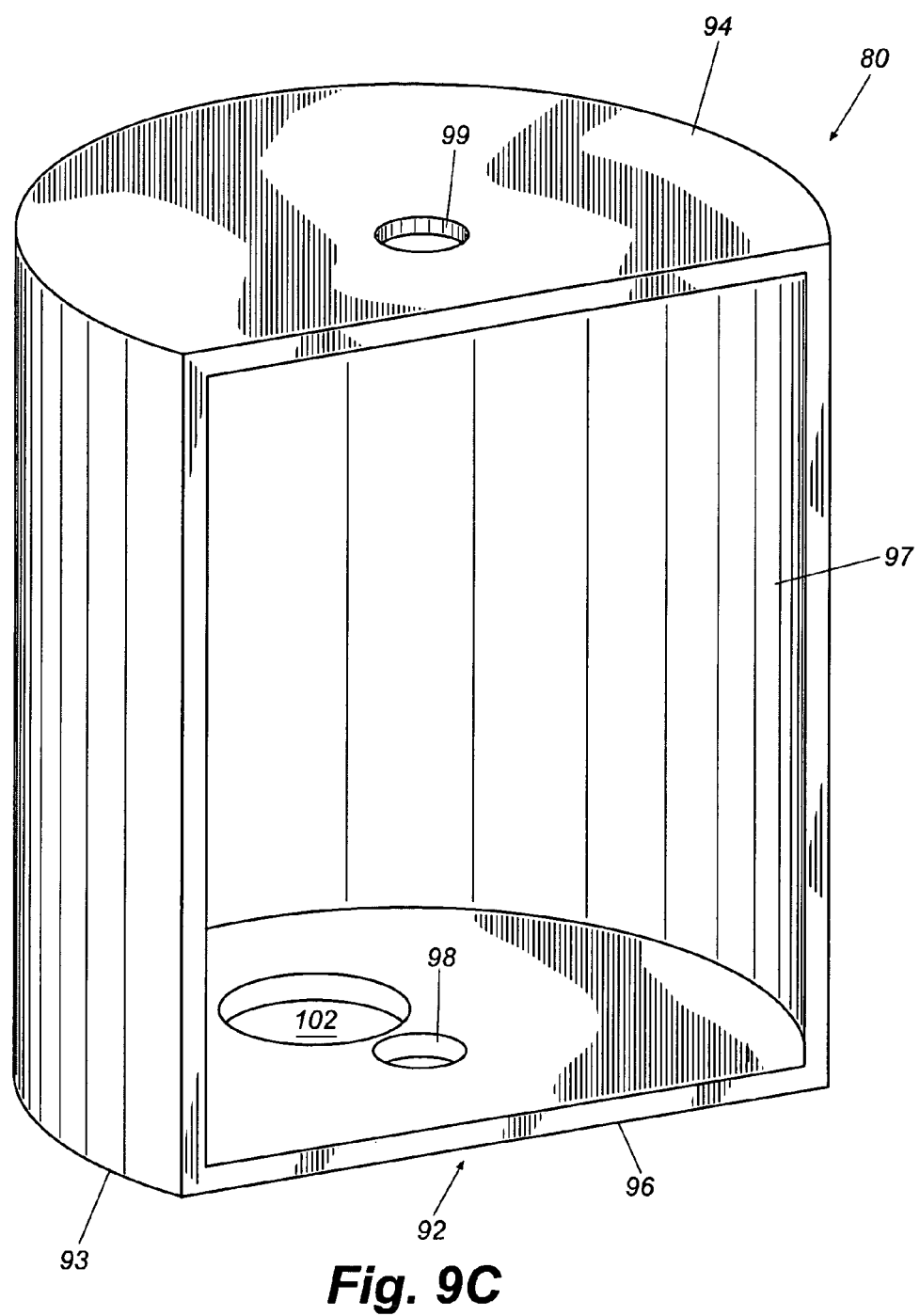

FIGS. 9A–9C illustrates yet a further embodiment 80 of the fuel intake device of the present invention. In this embodiment, the fuel intake device 80 is oriented substantially vertically and includes an inner chamber or housing 81 (FIGS. 9A and 9B) having a substantially cylindrical side wall 82 that terminates at a substantially flat wall 83, a portion of which, indicated at 84 in FIGS. 9A and 9B, extends or projects outwardly and typically is flush with the surface of the vehicle. The inner housing includes upper and lower end walls 86 and 87 that, together with side walls 82 and 83, define an open nozzle receiving area 88 therein. A nozzle receiving opening port 89 is formed in the bottom end wall 87 of the inner housing for receiving the nozzle of a gas pump therein. The nozzle opening port 89 can be formed with a rim 91 or can have a sealing or gasket material applied thereabout to form the rim, which provides a seat and bearing surface against which a rubber skirt or cover of a gasoline nozzle can bear, so as to seal the port or opening against the escape of fumes.

As illustrated in FIG. 9C, the fuel intake device 80 of this embodiment further includes an outer housing 92 having a substantially cylindrical side wall 93 with upper and lower end walls 94 and 96 defining an open ended chamber or recess 97 in which the inner housing 81 (FIG. 9A) is received. Openings 98 and 99 (FIG. 9A) are formed in the upper and lower end walls 94 and 96 of the outer housing and receive hinge pins 101 attached to the upper and lower end walls of the inner housing to enable pivoting movement of the outer housing with respect to the inner housing. The outer housing further includes a nozzle opening 102 formed in the lower end wall thereof, which typically will include a gasket or other flexible, rubberized sealing material about its upper and lower edges thereof.

The outer housing is rotatable with respect to the inner housing to move the outer housing between a closed, non-operative position and an open, operative position, wherein its nozzle opening 102 is moved into communication with the nozzle opening port 89 (FIG. 9A) formed in the lower end wall of the inner housing and with an inlet end of a vehicle fuel inlet pipe. As a result, a passage between the nozzle opening port of the inner housing and inlet opening of the vehicle fuel inlet pipe and enable the nozzle of the fuel pump to be inserted therein for inputting fuel. When the outer housing is in its closed, non-operative position, the inlet opening of the vehicle fuel inlet pipe will be substantially sealed (other than a pressurization valve and a depressurization valve) to prevent escape of fumes or the passage of water, debris or other materials into the vehicle fuel inlet pipe. Still further, a biasing member, such as a spring, can be provided to bias the outer housing toward its closed, non-operative position to maintain the outer housing in its closed, non-operative position until a fueling operation has commenced.

In addition, while the present invention has generally been illustrated with the cover being pivotable upwardly so as to open and permit access to the vehicle fuel intake device of the present invention, it will be understood by those skilled in the art that the cover also can be mounted and opened in other orientations or directions, such as being opened laterally toward either side of the vehicle well, or further pivoted downwardly as necessary or desired. The present invention therefore is not intended to be, nor should it be limited to a specific orientation or direction of opening of the cover.

Still further, in order to try to help reduce static discharge when pumping gas, the vehicle fuel intake device of the present invention can be subjected to being weighed or biased toward its closed position, such as by a spring or similar biasing element. Accordingly, an operator generally will be required to grasp and hold the cover of the vehicle fuel intake device in its open position to insert the fuel/gas pump nozzle therein. As a result, any static electricity built up between the operator and the vehicle likely will be discharged before the fueling operation can be started to reduce the risk of accidents from static discharges.

Figure 10:
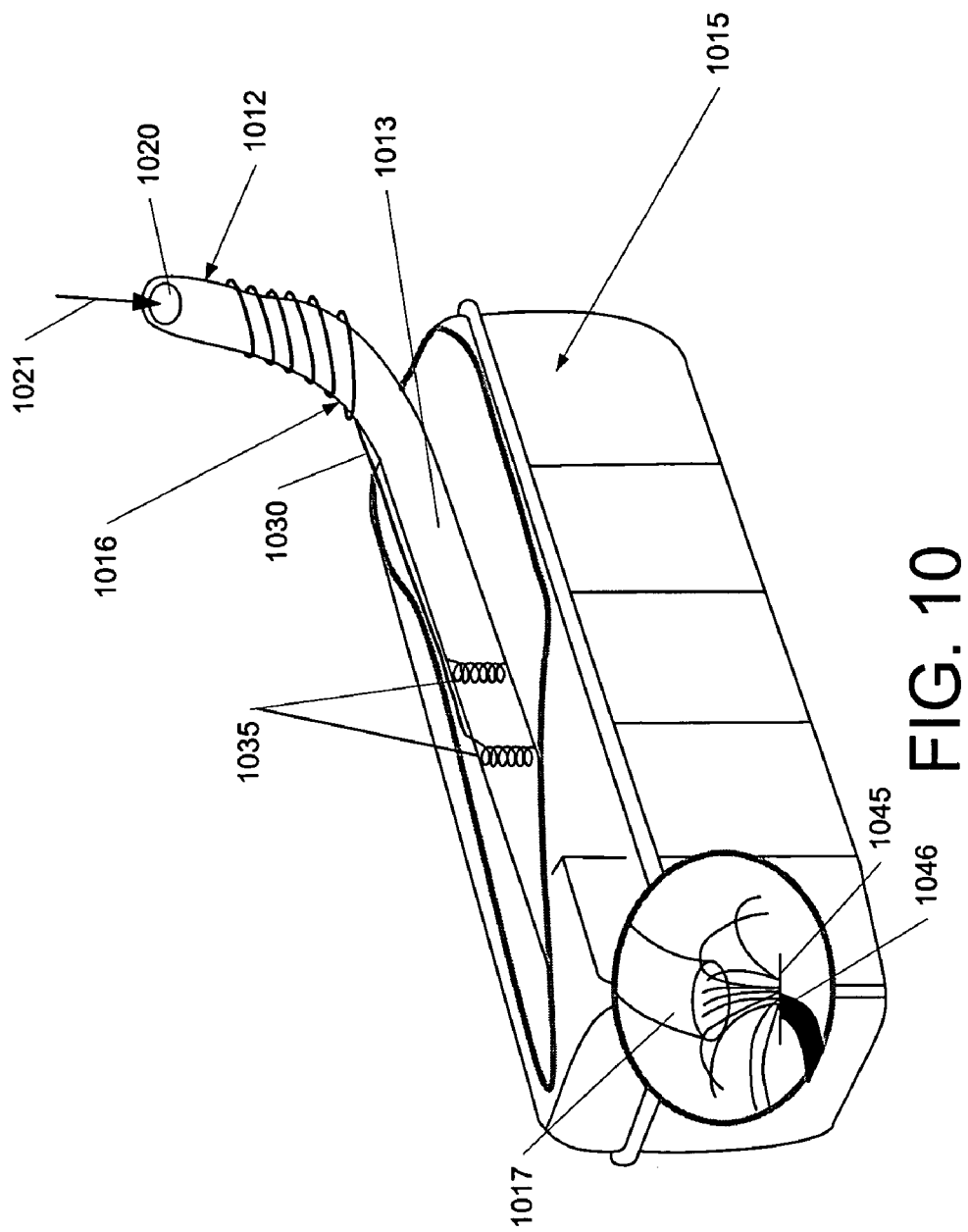
FIG. 10 is a side view of a fuel tank with the coil condensation system.
Figure 11:
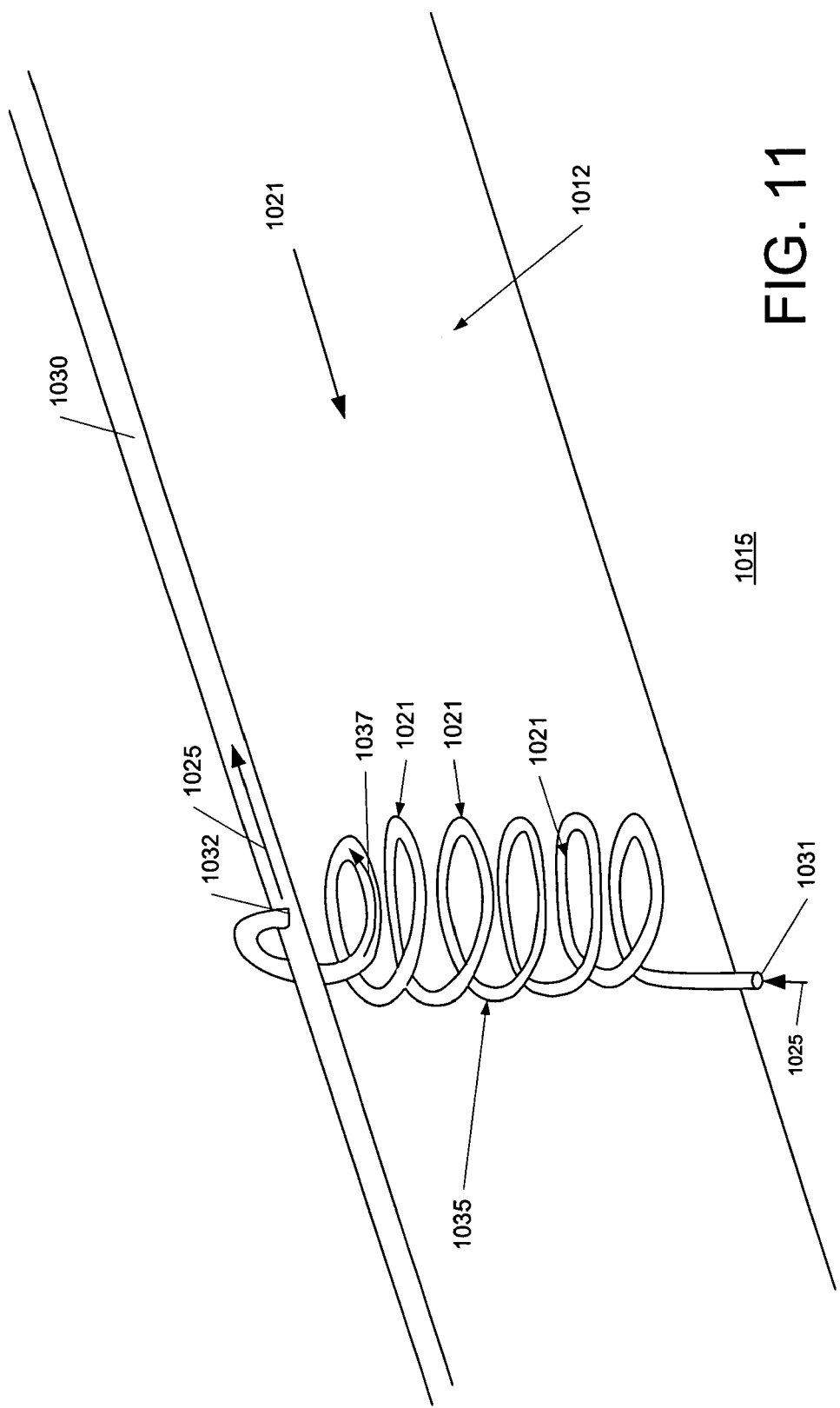
FIG. 11 is a schematic illustration of a coil of FIG. 10.

Additionally, the vehicle fuel intake device of the present invention also can be utilized with a fuel vapor reclamation system shown in FIGS. 10–11 that will generally include a condenser coil or unit mounted about the vehicle fuel inlet pipe. The condenser coil extends along the fuel inlet pipe from a first or vapor inlet end positioned within the vehicle fuel tank, to an upper, distal end outside of the fuel tank and adjacent the upper end of the vehicle fuel inlet pipe that is in communication with the vehicle fuel intake device (FIGS. 1–9B) of the present invention as discussed above. As fuel is received in the fuel tank, the fuel tends to displace fuel vapors that have built up within the fuel tank as the fuel tank was emptied during operation of the vehicle. Such vapors are received at the open inlet end of the condenser unit and are passed about the vehicle fuel inlet pipe toward the upper end thereof. As a result, the vapors generally will be caused to condense into a liquid state. The now liquid fuel can then be fed back into the vehicle fuel inlet pipe at the upper, distal end of the condenser coil for reintroduction into the fuel tank. The amount of vapors being released into the surrounding environment thus can be reduced, as well as at least a portion of the fuel lost via the escape of such vapors, reclaimed.

As shown in detail in FIGS. 10 and 11, the fuel vapor reclamation system includes a series of coils 1035 mounted or formed within or along the fuel intake pipe 1012 that extend along the fuel intake pipe 1012 as it travels at a slightly downward angle from where an upper, intake end 1020 through which a fuel nozzle inputs a fuel flow 1021 to where the fuel flow 1021 is dispensed into the fuel tank 1015 of the vehicle. As further shown in FIG. 10, the upper, intake portion 1020 of the fuel intake pipe 1012 generally is of a conventional size and includes an expanded or wider size segment or section 1013 extending from the point of abutment of the intake pipe 1012 abutment with the fuel tank 1015 (shown for reference at numeral 1016) to a lower or discharge end 1017. This increased size or volume of the fuel intake pipe 1012 is included to accommodate, without an appreciable reduction in the input of the fuel flow, a series of spaced coils 1035 as indicated in FIG. 10.

As shown in further detail in FIG. 11, the coils 1035 generally are of a size and spacing to permit the fuel flow 1021 to easily pass between the coils 1035 to not interfere with the fuel flow. The coils 1035 connect to a fume tube 1030 that runs along the top of the fuel intake pipe 1012 and wraps or is coiled about the intake pipe adjacent the upper end 1020. The coils 1035 receive fuel fumes 1025 from the fuel tank 1015 through an intake hole 1031 at the bottom of coils 1035 and which opens the fuel tank 1015. The fuel fumes 1025 generally are urged into and travel along the coils 1035 and to a tube outlet hole 1032 and into fume tube 1030 as a fuel flow fills the tank, which accordingly displaces the fumes in the tank. At the same time, the incoming fuel flow will cool the coils to promote condensation of the fumes passing therethrough.

The coils 1035 channel and permit condensed fuel/fumes 1037 to flow in an opposite direction to the fuel fumes 1025 and reenter the fuel tank 1015 as fuel. The fume tube 1030 runs along the fuel intake pipe 1012 to point 1016, where the intake pipe turns and proceeds upwardly to its upper end 1020 as shown in FIG. 10. The fume tube 1030 can proceed in any manner up the remainder of the fuel intake pipe 1012, but will typically wrap or coil about the outside of the fuel intake pipe 1012 as shown. The fume tube 1030 also can be resident within the fuel intake pipe 1012, either being integrally formed as a separate channel within the intake pipe or otherwise mounted or positioned therein, to further provide cooling from the fuel flow to enhance condensation of the fuel fumes 1025. Regardless of whether the fume tube 1030 is wrapped on the inside or outside of the fuel intake pipe 1012, the fume tube 1030 generally will be cooled by the incoming fuel flow 1021. Alternatively, or in addition to the cooling provided by the incoming fuel flow 1021, the coils and fume tube can be cooled by attachment to the air conditioning unit of the vehicle or some other method (not shown). Such cooling by the air conditioner or other method would provide an additional measure to maintain or create a desired temperature differential to facilitate condensation of fuel fumes in the coils or fume tube.

The expanded section 1013 of the fuel intake pipe 1012 extends along the fuel tank 1015 until the fuel intake pipe 1012 extends into the fuel tank 1015 to disperse the flow of fuel into the fuel tank. This transition from a wider sized fuel intake pipe 1013 to a more conventional or reduced sized fuel intake pipe 1012 can vary per fuel tank 1015 and vehicle. The fuel intake pipe 1012 generally returns to a regular or narrower sized fuel intake pipe 1012 toward its discharge end 1017 so that the fumes do not rise up the pipe and circumvent the coils 1035. As also shown in FIG. 10, a splash plate 1045 can be inserted near the end of the fuel intake pipe 1012, mounted on a support 1046.

The coils 1035 are formed of a shape and size to remove the fuel fumes 1025 from the tank 1015 and to not impede the fuel flow 1021 proceeding along the fuel intake pipe 1012 and entering the fuel tank 1015. Although some fuel fumes 1025 will inherently escape initially upon fueling, as the fuel intake pipe 1012 becomes filled with fuel during a fueling operation, the displaced/escaping fuel fumes 1025 generally will be directed to and pass through the coils 1035. The coils 1035 are dispersed at varying locations along the fuel intake pipe 1012 to promote more even distribution of the fumes through the coils 1035 as the fuel flow 1021 fills the fuel tank 1015. Although FIG. 10 shows only two coils along the fuel intake pipe 1012, the coils 1035 typically will extend from point 1016 to the end of the fuel intake pipe 1012. The coils 1035 are cooled by the fuel flow to cause the fuel fumes 1025 in the coils and fume tube 1030 to condense as the fuel tank 1015 fills. The condensed fuel 1037 can either pass back into the tank from the coils or from the upper end of the fume tube after the filling operation is ended. As the fuel tank 1015 level rises during filling, some of the coils 1035 will be taken out of operation because they will become below the fuel level.

The coils 1035 further will gradually fill with fuel as the fuel level continues to rise. The wider sized portion of the fuel intake pipe 1013 will thus provide extra room for the fuel to flow a bit slower in the middle of the intake pipe 1012 while the fuel continues to pour out the discharge end of the fuel intake pipe 1012 and while the fuel fumes 1025 continue to rise through the coils 1035. The coils 1035 are also generally formed of a size to promote condensation and can be included in any number and arrangement along the fuel intake pipe 1012 with the number and size dependent upon the type of fuel, length of intake pipe 1012, and type of tank 1015 used in the vehicle. The fume tube 1030 extends up the fuel intake pipe 1012 and spirals around the inlet portion of the intake pipe 1012 to further provide a condensation path for the fumes before they are vented into the vapor collector of the fuel nozzle.

The coils 1035 in this embodiment also have been shown in the figures as round in shape, but can be formed in any desired shape. For example, the coils 1035 may be elliptical or rectangular, have a flattened slot-like center, be rounded only on the ends, or be merely a slit. Additionally, the coils 1035 may be provided with multiple chambers therein to encourage condensation of the fuel from the fuel fumes 1025. Still further, although the condensation devices provided herein have been shown as coils, any other configuration that permitted or encouraged recycling of fumes into usable fuel could be utilized. For example, one could utilize fins such as seen in radiators in place of the coils.

The intake and outlet holes 1031 and 1032 in the coils 1035 closer to the upper end of the intake pipe can be larger than the holes 1031 and 1032 in the coils 1035 closer to the lower section or end of the intake pipe to further aid in evenly distributing the fuel fumes 1025 along the array of coils 1035. Additionally, selected ones of the tube outlet holes 1032 also could house a valve that would open an even larger outlet opening once the fuel within the tank has reached a certain point that those valved holes (not shown) were the only ones receiving fuel fumes 1025. The use of such a valve could provide a further release mechanism to let out additional fumes as needed. Thus, the fuel tank 1015 could be filled to capacity without having the fuel nozzle shut off prematurely.

The coils 1035 of the present embodiment can be integrated with the other embodiments detailed above. For example, with the cylinder 51 of FIGS. 1–4 and 7–9, a separate hole (not shown) could be included that aligns with the body or pipe portion 12 of the fuel intake device 10. As the cylinder 51 turns, the pipe 12 would allow any fuel fumes 1025 that have not condensed to escape. This design will ensure that the fuel fumes 1025 will not escape when the fuel intake device is placed in a closed position. Additionally, this design will meet the current environmental standards for fueling stations by allowing a nozzle vapor collector, typically on the outside of the fuel nozzle, to collect the fuel fumes 1025 escaping from the nozzle and from the fume tube 1030.

Figure 12:
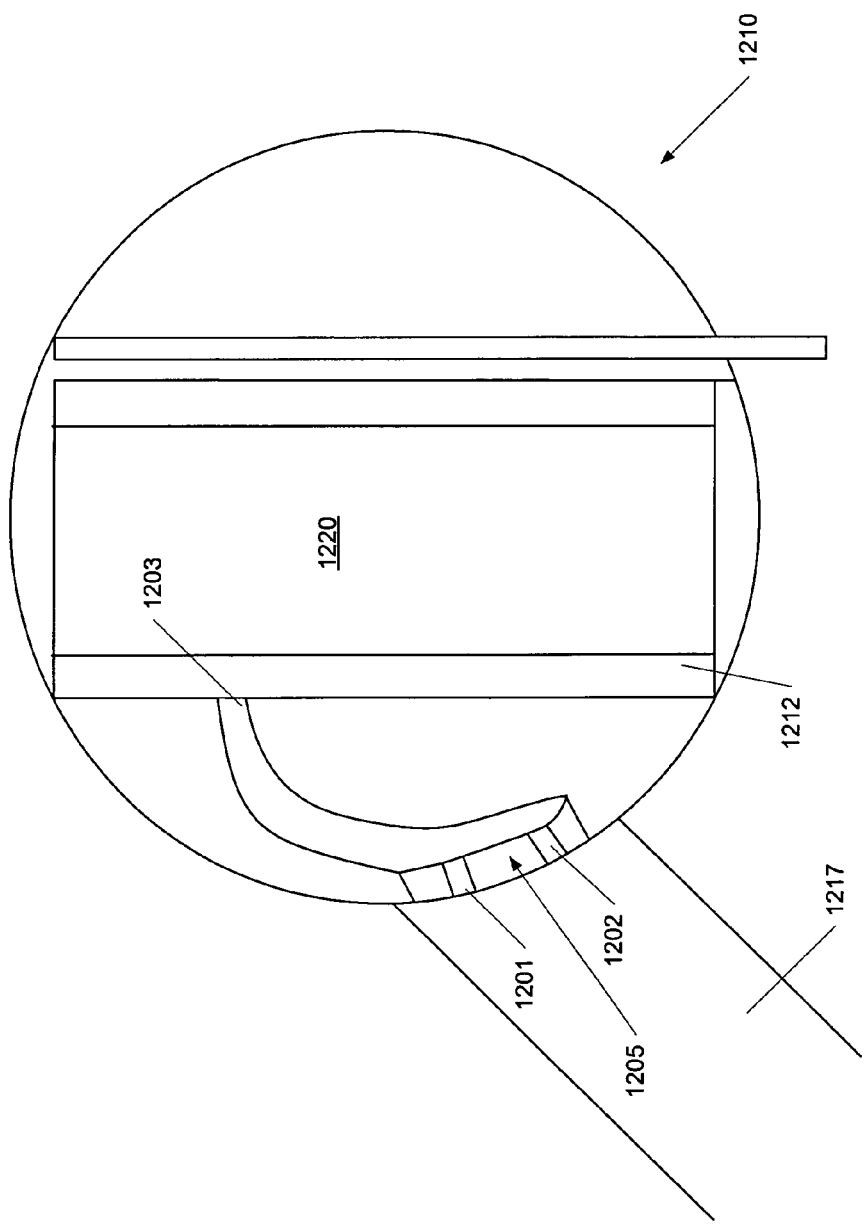
FIG. 12 is a cross-sectional view of the vehicle fuel intake device in the closed position and with pressurization and depressurization valves in a removable cap.
Figure 13:
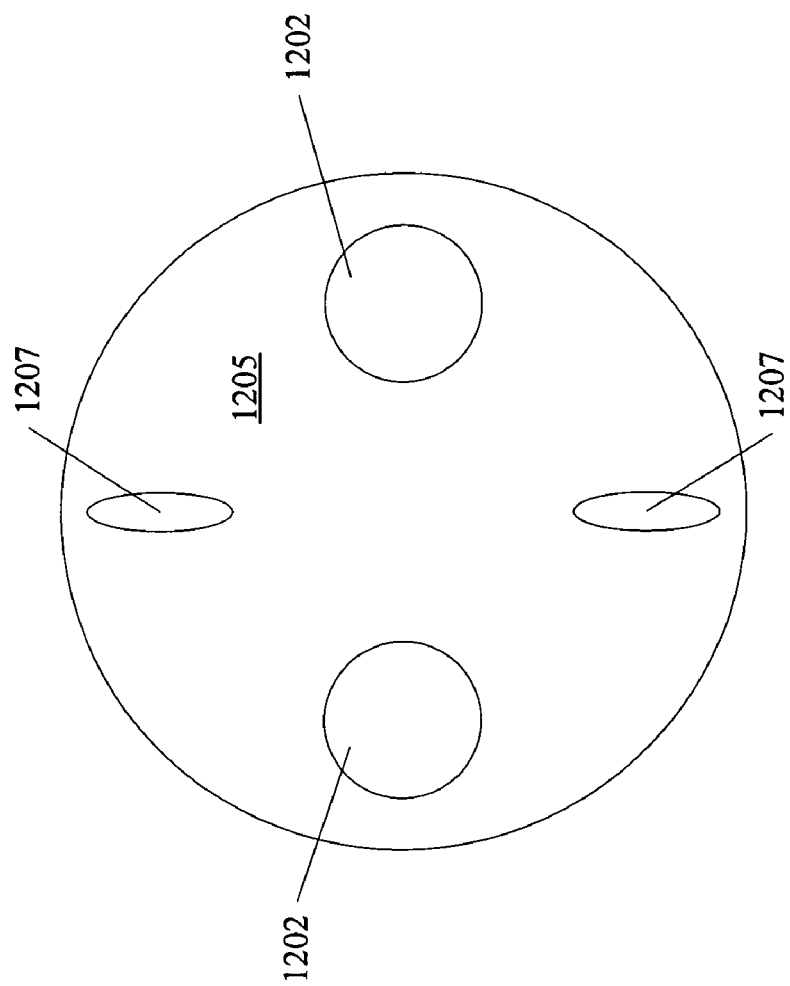
FIG. 13 is a detailed view of the removable cap with the valves of FIG. 12.

As further shown in FIGS. 12 and 13, a pressurization/depressurization valve 1201 can be placed in the base portion 1213 of a fuel intake device 1210 to rotate over the vehicle fuel inlet pipe 1217 when the fuel intake device 1210 is in the closed, non-operative position. The pressurization/depressurization valve 1201 generally includes pressurization and depressurization passages or ports 1202 and 1203, respectively, that communicate with a relief passageway 1204 to facilitate the pressurization or depressurization of the valve 1201 as required by the fuel tank 1215 and/or movement of the fuel intake device 1210. The pressurization/depressurization valve 1201 can be recessed into the base portion of the fuel intake device to an extent sufficient to not interfere with the fuel intake device 1210 or the vehicle fuel inlet pipe 1217 during rotation from closed to open or open to closed positions. Typically, the pressurization/depressurization valve 1201 is formed in or mounted on a removable cap 1205, and is received in an end of the relief passageway 1204, or in an alternative unsealed area, to allow communication with the pressurization valve 1201 and depressurization valve 1202. The removable cap 1205 is typically screw-threaded into the base portion 1213, but can be attached to the base portion in any manner that permits an airtight seal.

As shown in detail in FIG. 13, the removable cap 1205 includes indentations 1207 capable of receiving a removal tool (not shown). The indentations 1207 are shown in FIG. 13 as substantially oval-shaped, but can be of any configuration capable of receiving and engaging a removal tool for removal of the removable cap 1205 from the base portion 1213 of the fuel intake device. The removable cap 1205 thus will allow for testing of the pressurization/depressurization valve 1201 to enable the fuel intake device 1210 of the present invention to meet current emissions and environmental requirements of several states for testing of the vehicle's fuel and emissions control system.

The removable cap 1205 can also include a lock mechanism (not shown) for securing the removable cap 1205 within the base portion 1213. Such a lock mechanism can include any system capable of retaining the removable cap 1205 in place, including locking pins. The lock mechanism can also interact with the removal tool to allow the removal tool to disengage the lock upon insertion of the removal tool into the indentations 1207 and/or to engage the lock upon removal of the removal tool. For example, the engaged lock mechanism could operate with a spring operable by the removal tool to disengage a pin or pins holding the removable cap securely in place. The removal tool could operate to release the spring for removal/release of the removable cap 1205 from the base portion 1213. To replace the removable cap 1205, the removal tool could also compress the spring and engage the pin or pins for locking the removable cap 1205 in place. In this manner, a tester could remove the cap for environmental testing and receive a positive indication that the cap was replaced in the proper position upon reinstallation.

Additionally, the other elements herein can be replaced with elements that perform similar functions, but that are arranged in different configurations. For example, the fume tube has been shown mated with the vehicle fuel intake pipe, but could be formed independently and aligned along the top of the vehicle fuel intake pipe. In addition, the splash plate is shown as attached to the wall of the fuel tank, but could be attached to and extend from the vehicle fuel intake pipe.

In an alternative embodiment, an internal valve is provided to fit into an existing gas intake pipe (as original equipment or to replace an existing gas cap). The internal valve is housed in a chamber that can be spherical or cylindrical, but that has been shown in FIGS. 14–18B as cylindrical for simplicity. The fuel intake device 1410 of FIGS. 14–18B utilizes corresponding numbering for corresponding features from other embodiments; including fuel intake device 1410, intake body or pipe 1412, pivot pins 1416, and fluid flow passage 1420 defined through the intake body or pipe 1412 and which communicates with the vehicle intake flow pipe 1417. The fuel intake body 1412 is generally formed from a metal material such as aluminum or other types of corrosion resistant materials such as various synthetic or plastic materials.

Figure 14:
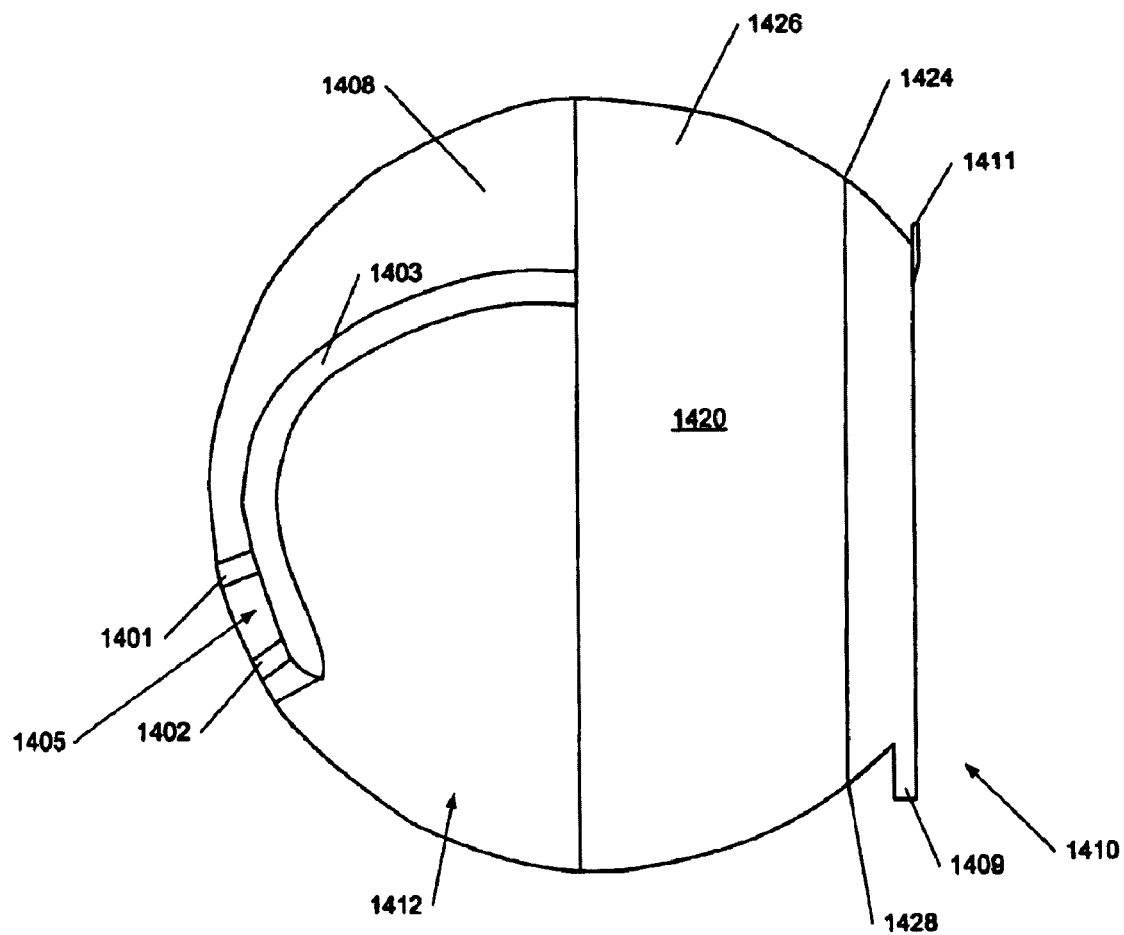
FIGS. 14–16 show various views of an intake pipe for an additional embodiment of the vehicle fuel intake device.
Figure 15:
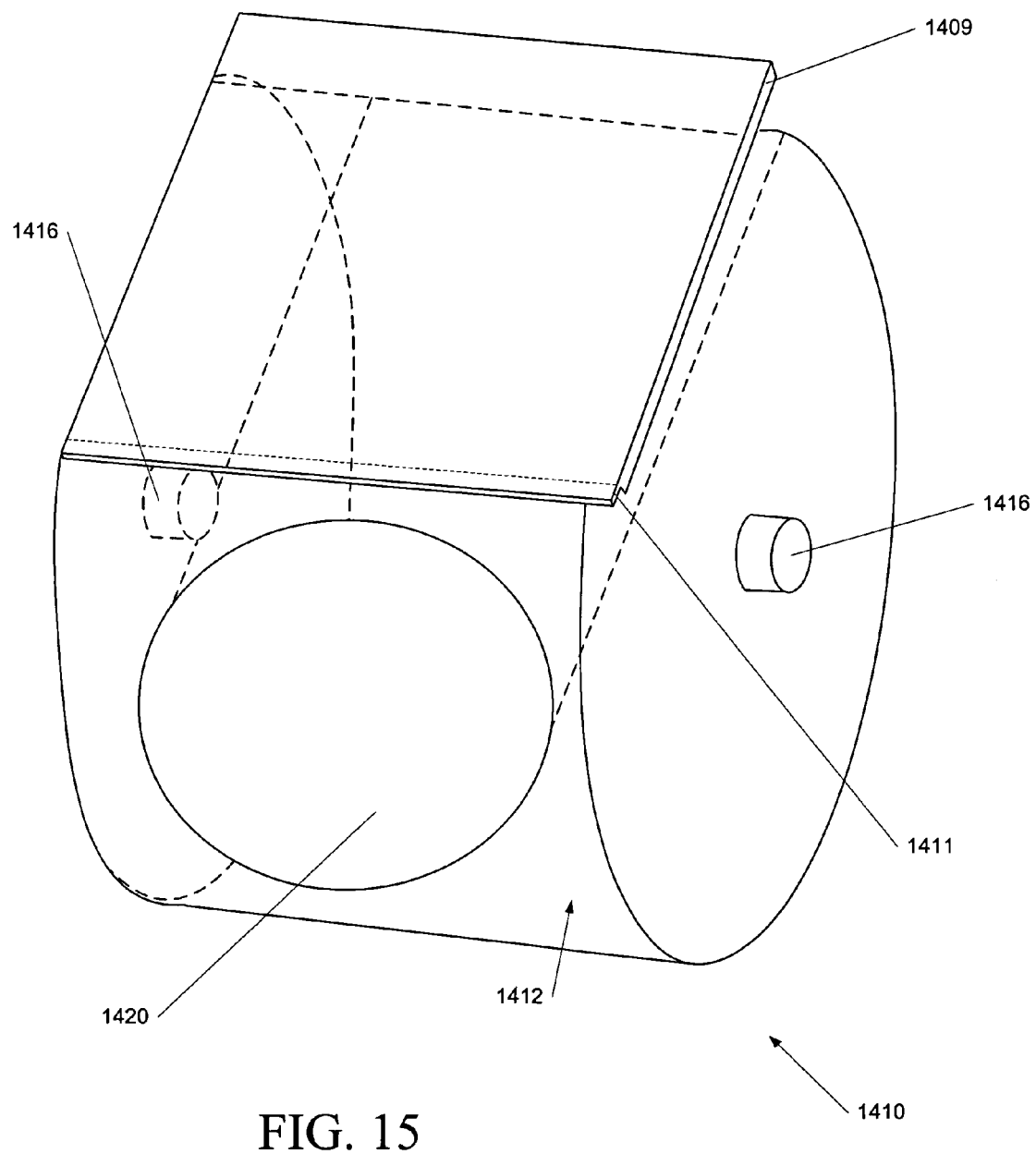

FIGS. 14–15 show the vehicle fuel intake device 1410. In FIG. 14, the fuel intake body 1412 generally includes flow passage 1420 with a forward or proximal end 1424, an intake opening 1426, and a distal end 1428. The fuel intake body 1412 is allowed to pivot on pins 1416, as shown in FIG. 15, to move between open and closed positions using a body handle or lip 1409. The fuel intake body 1412 can also include a stop 1411 to arrest the rotation from the closed to open position. Although the stop 1411 is shown in the FIGS. 14–18B as an edge that will engage the base portion 1413, the stop 1411 could be a bracket, lip, or any arrangement that will enable the passage 1420 to be aligned with the vehicle fuel inlet pipe 1417. The fuel intake body 1412 can also include any of the features of the embodiments detailed above. As indicated in FIGS. 14 and 18B, the lower portion 1408 of the intake body completely covers the opening of the fuel intake pipe 1417 when the fuel intake device 1412 is in the closed position.

As shown in FIG. 14, pressurization/depressurization valves 1401, 1402 can be provided in a lower portion 1408 of the fuel intake body 1412. The valves are aligned with the intake pipe 1417 when the device is in the closed position with respect to the vehicle fuel inlet pipe 1417. The pressurization/depressurization valves 1401, 1402 generally include pressurization and depressurization passages or ports that communicate with a relief passageway 1403 to facilitate the pressurization or depressurization of the valves 1401, 1402 as required by the fuel tank and/or movement of the fuel intake device 1410. The pressurization/depressurization valves 1401, 1402 also could be recessed into the base portion of the fuel intake device to an extent sufficient so as to not interfere with the fuel intake device 1410 or the vehicle fuel inlet pipe 1417 during rotation of the fuel intake body 1412 between its closed and open or open and closed positions. The pressurization/depressurization valves 1401, 1402 also could be formed in or mounted on a removable cap 1405 that would be receivable into an end of the relief passageway 1403, or in an alternative unsealed area. The pressurization/depressurization valves 1401, 1402 also could be formed as an integral part of the body 1412 of the fuel intake device 1410. As an integral unit, the pressurization/depressurization valves 1401, 1402 would render themselves to testing in an analogous manner as traditional fuel caps that are removed and placed in a testing apparatus for pressurization/depressurization.

Figure 16:
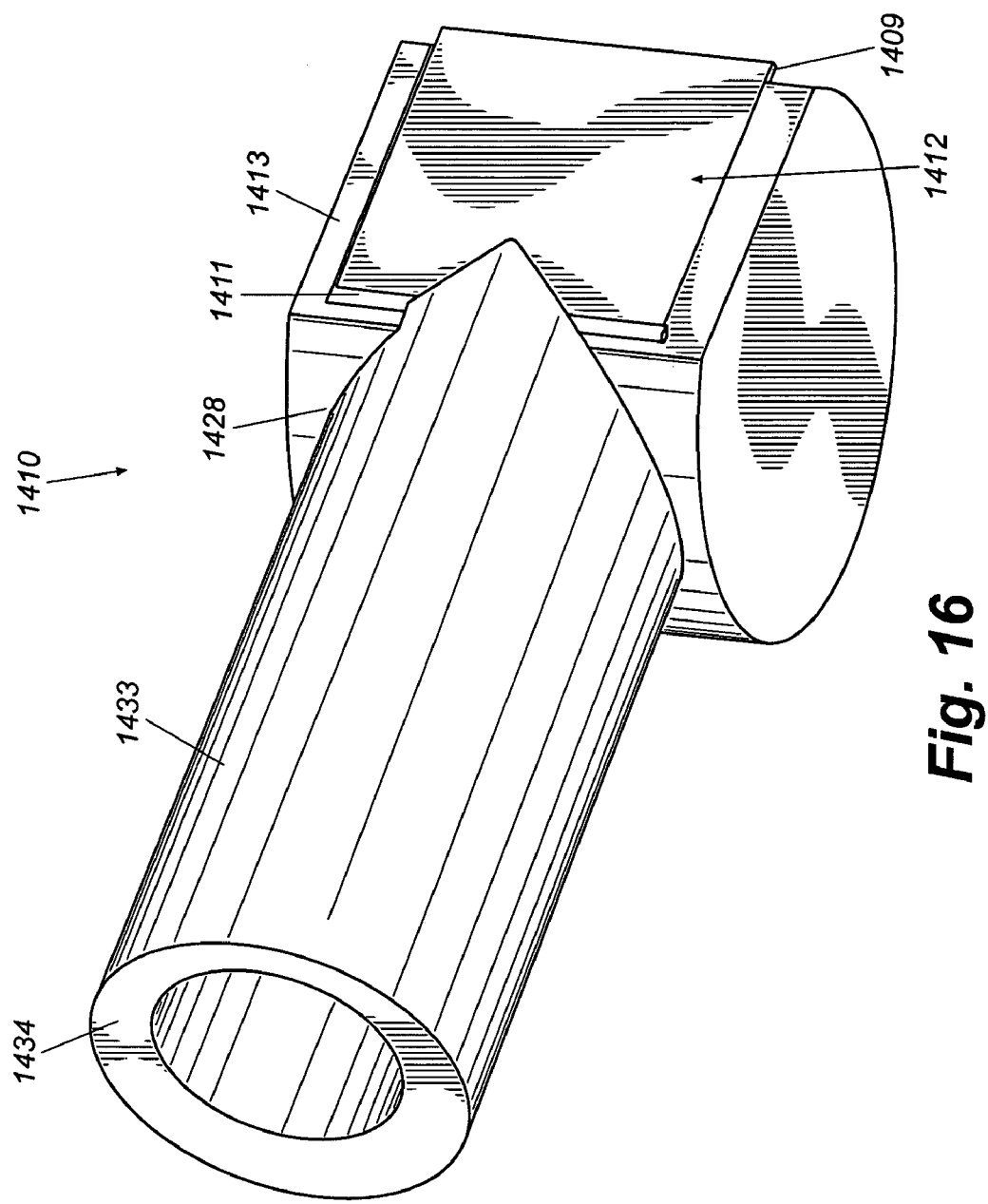
Figure 17:
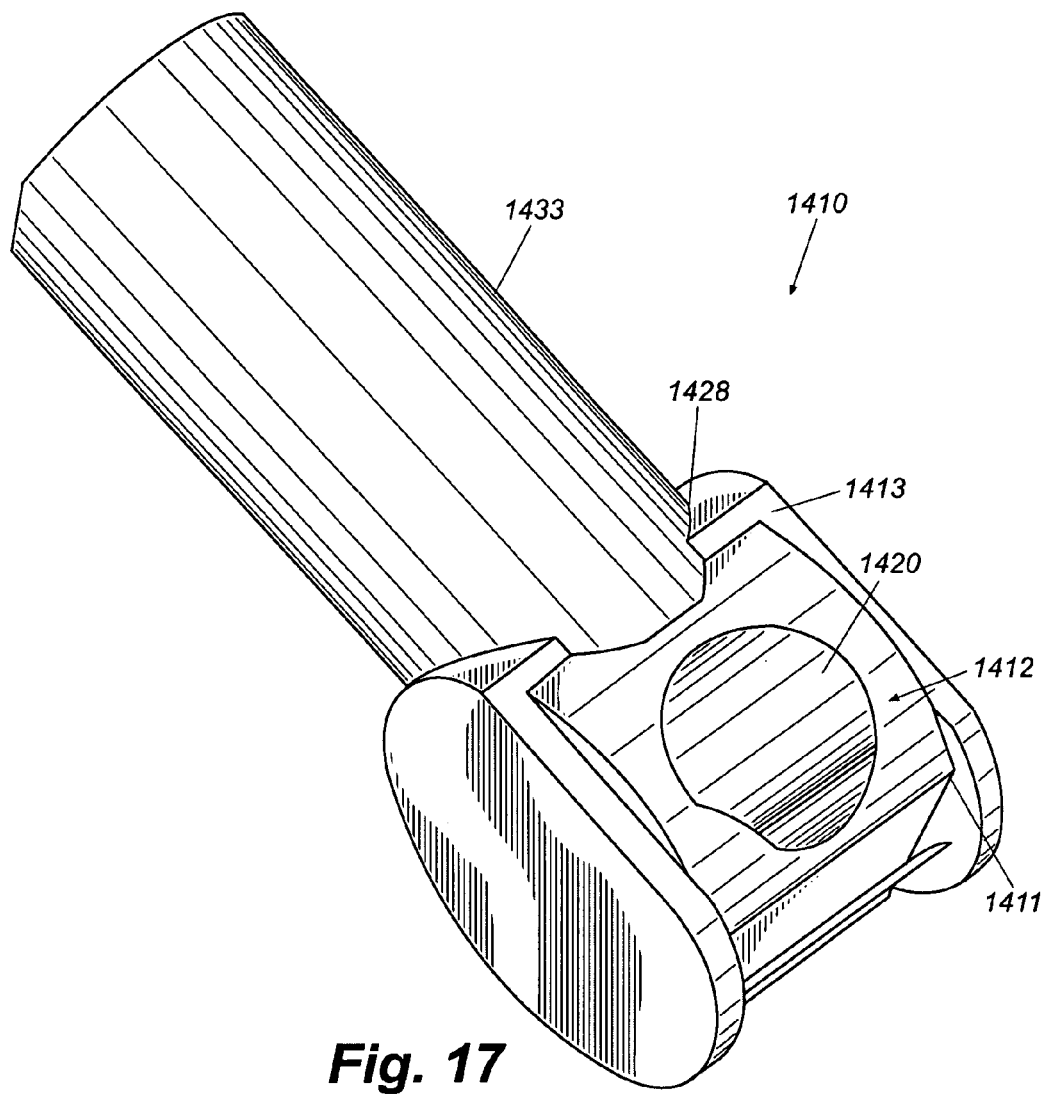
FIG. 17 is a detailed view of the intake pipe of FIGS. 14–16 in a hollow chamber of a cylinder shell.
Figure 18A:
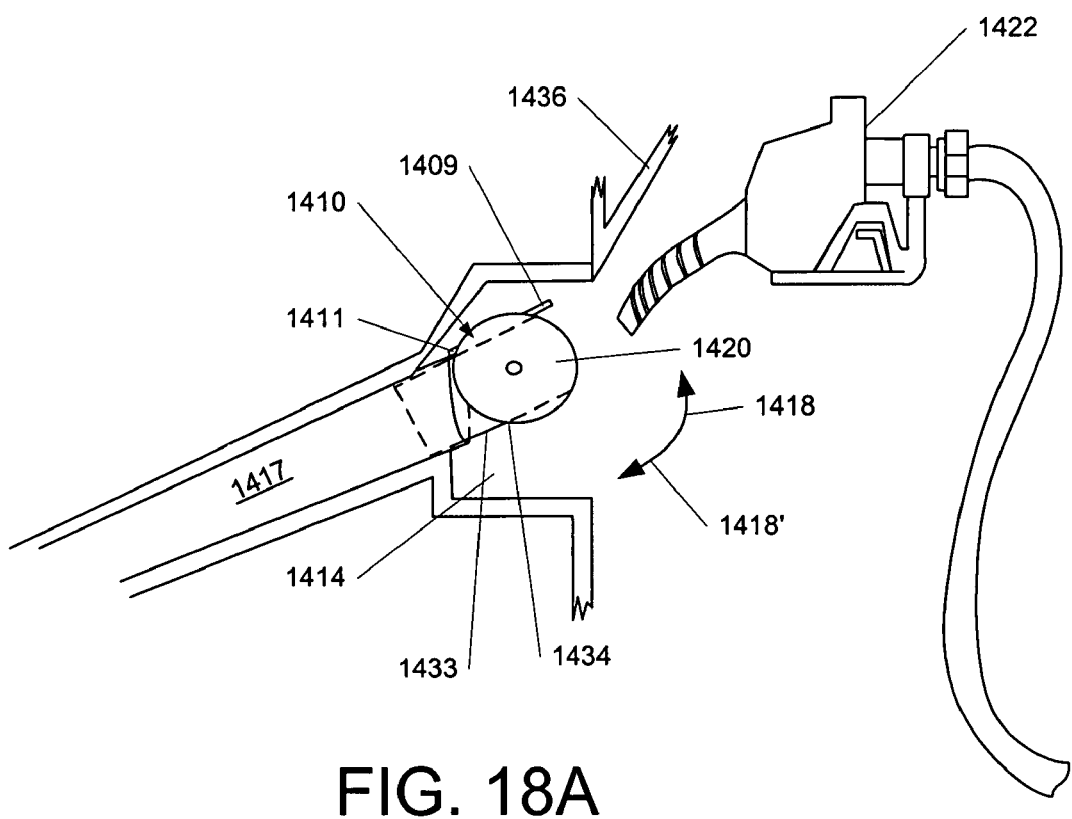
FIG. 18A is a perspective illustration schematically illustrating an alternative design of the fuel intake device in an open position for receiving a fuel nozzle of a gas pump.
Figure 18B:
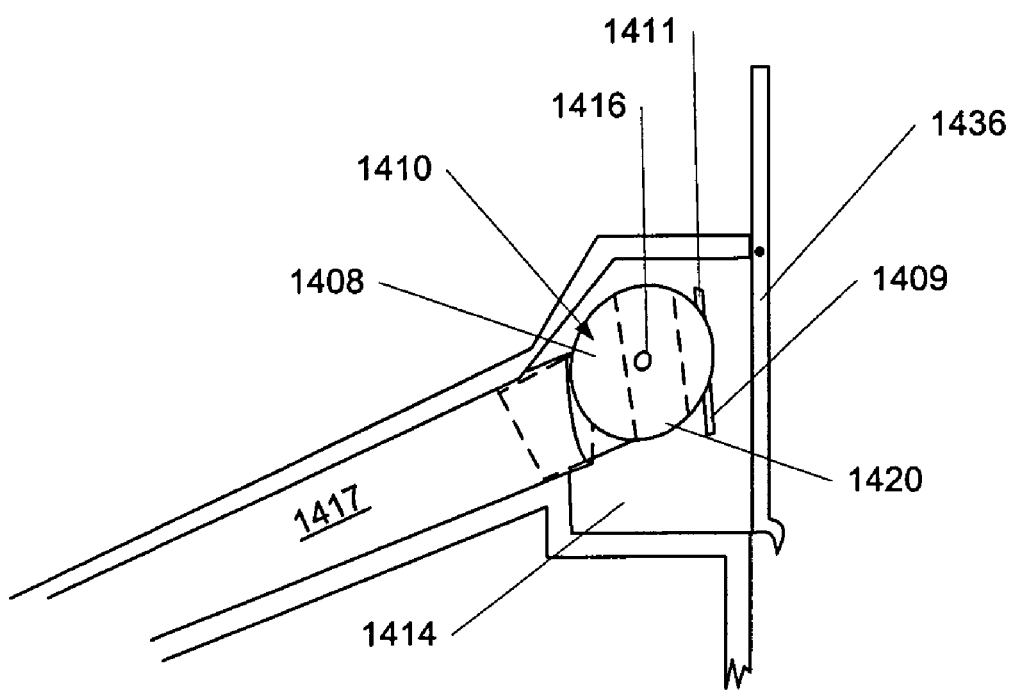
FIG. 18B is a side view schematically illustrating the fuel intake device of FIG. 18A in a closed position.

As shown in FIGS. 16 and 17, the fuel intake body 1412 typically is pivotally mounted within a larger cylindrical base portion 1413 and can be pivoted through the use of pivot pins or rods 1416 from a closed position that occludes or seals the vehicle flow intake pipe 1417 to an open position in alignment with vehicle flow intake pipe that opens the intake pipe to allow fuel to flow therethrough. As a result, the intake pipe 1412 of the fuel intake device 1410 is enabled to pivot from a closed position, as shown in FIG. 18B, to an open position as illustrated in FIG. 18A, by being rotated in the direction of arrow 1418. The base portion 1413 generally is formed from a metal, synthetic, or plastic material and will be secured within a recess or well 1414 of the vehicle (FIGS. 18A and 18B). The base 1413 further can be of a reduced size sufficient to support the intake pipe 1412 and define a valve between the intake pipe 1412 and a vehicle fuel inlet pipe 1417. The intake pipe or body 1412 of the fuel intake device 1410 defines the intake or flow passage 1420 through which fuel can be pumped from a fuel pump nozzle 1422, as indicated in FIG. 18A. With reference to FIG. 18A, the distal end 1428 of the fuel intake body 1412 communicates with a proximal end 1434 of the extension 1433 to define a closable valve between the proximal and distal ends of the intake pipe 1412 and the extension 1433. The extension 1433 then communicates with fuel inlet pipe 1417 after being received therein.

FIGS. 16 and 17 show the intake pipe 1412 of FIGS. 14–15 in further detail, illustrating the intake pipe communicating with a pipe fitting extension 1433 that is formed to fit into the gas intake pipe 1417 to install the intake device 1410 in the vehicle. The pipe fitting extension 1433 is designed to fit snugly within the gas intake pipe 1417 and can be threaded to allow removal from the vehicle or can be permanently mounted within the gas intake pipe 1417. The pipe fitting extension 1433 can be of any length necessary to extend into the pipe and securely hold the fuel intake device 1410 therein. Typically, the pipe extension 1433 will not extend into the manufacturer's valve resident in the gas intake pipe 1417. Additionally, since the pipe fitting extension 1433 could be affixed over or extend forwardly from the gas intake pipe 1417, the present embodiment should not be limited to encompass only internal fittings. As the intake device is pivoted, the intake pipe will be moved into the open position with the flow passage 1420 aligned within the extension 1433 for receipt of fuel into the gas intake pipe 1417.

In order to ensure exact placement of the fuel intake device 1410 into the recess 1414 and fitting into the pipe 1417, the lid should be facing a driver standing outside the vehicle and should open toward the inside of the vehicle. This desired placement will likely result in different size or configurations of the fuel intake device as needed to fit different model vehicles, depending upon how the fuel inlet systems/components are designed. Since fuel intake pipes are not identical between manufacturers, washers, gaskets, rings, or other sealing devices also could be used to help fit and secure the fuel intake device over the fuel intake pipe or pipe fitting extension to ensure proper alignment with the threads for a tight fit and seal when the fuel intake device 1410 is installed. For example, the fuel intake device could include three gaskets that could be added or removed individually as desired to align the fuel passage in a preferred orientation during installation.

FIGS. 18A and 18B show the fuel intake device 1410 received into the vehicle well 1414 and pipe fitting extension 1433 inserted into the gas intake pipe 1417. FIG. 18A shows the fuel intake device 1410 in an open position with intake passage 1420 aligned with gas intake pipe 1417 after rotation of the fuel intake device 1410 and a cover 1436 in the direction of arrow 1418. As a result, when the intake pipe 1412 of the fuel intake device 1410 is pivoted in the direction of arrow 1418 to its open position, the fuel intake or flow passage 1420 through the intake pipe 1412 is placed in open communication with the passage of the vehicle fuel inlet pipe 1417 to allow fuel to be pumped from the nozzle 1422 therethrough.

Once a fueling operation has been completed and the fuel pump nozzle 1422 has been removed from the fuel flow passage 1420 of the intake pipe 1412, the fuel intake device 1410 can then be pivoted downwardly with handle 1409 in the direction of arrow 1418' (FIG. 18A) to its closed position whereupon the proximal and distal ends of the intake pipe and vehicle fuel inlet pipe 1417, respectively, are moved out of registration so as to close off and seal the passage therebetween, as indicated in FIG. 18B.

As further indicated in FIGS. 18A and 18B, a lid or cover 1436, such as typically found on most vehicles, generally will be provided for enclosing the fuel intake well or recess 1414. When the fuel intake device is in its closed position as shown in FIG. 18B, the cover 1436 will be lowered to a closed and covering position, enclosing the recess 1414. The lid 1436 could alternatively be formed as a part of, or connected to, the outer cylinder or base 1413 so as to rotate with the base or can be independently moveable as desired. Additionally, to facilitate the pressurization/depressurization valve 1401, the lid 1436 can include a small hole therethrough (not shown). In addition, a locking system (not shown) could be provided so as to secure the cover in a closed and locked position and prevent access to the fuel intake device and fuel inlet pipe of the vehicle when the fuel intake device is in its closed and locked position. The locking system could include a lock for the cover 1436 and/or a lock for the fuel intake device 1410 for additional security. The fuel intake device 1410 lock would prevent the device from untwisting and from flipping to the open position. The locks could be remotely or electronically actuated, such as by a button within the vehicle or by a key chain device, for added security.

The fuel device 1410 of the present embodiment can be formed of any necessary dimensions to fit within a recess of a vehicle. For example, the fuel intake body 1412 can be about 1–1.4 inches in width and about 1–2 inches in diameter with passage 1420 having a diameter of approximately 0.75 to 1.5 inches, and about 0.1–0.2 inches on each side of the passage 1420, though greater or lesser dimensions also can be used as needed. The pivot rods or pins 1416 each can be about 0.18 inches in diameter and extend approximately 0.1 inch or more from the side of the fuel intake body 1412. Further, the outer cylinder typically can be about 2–3 inches in diameter, and the pipe extension 1433 typically will be formed with a hole or passage of a sufficient size to match and align with the fuel intake passage 1417.

The embodiment of FIGS. 14–18B has been described herein for use as a fuel intake device, but it is contemplated that such device could be used in several applications, especially for use as a device for inputting oil for the engine, for inputting water for the radiator or washer reservoir, or for inputting other fluids.

It will be understood by those skilled in the art that while the present invention has been discussed with regard to preferred embodiments, various changes, additions, and modifications can be made thereto without departing from the spirit and scope of the invention.

What is claimed is:

1. A replacement fuel intake device for a vehicle, comprising a body portion that contains a housing that is pivotally mounted to be moveable between an open position and a closed position, and which defines a fuel intake passage that is in communication with a fuel intake pipe of the vehicle when in its open position, said intake device includes a depressurization valve that is aligned with the fuel intake passage of the vehicle fuel pipe and is operable when the fuel intake device is in the closed position, said fuel intake device further includes a passageway that allows testing of said depressurization valve.

2. The fuel intake device of claim 1 and further including a pressurization valve that is aligned with the fuel intake passage of the vehicle fuel pipe and is operable when the fuel intake device is in the closed position.

3. The fuel intake device of claim 2, wherein a passageway is provided in the fuel intake device that allows testing of the pressurization valve.

4. A replacement fuel intake device for a vehicle comprising:
   a body capable of being received within a fuel intake pipe of the vehicle;
   a housing pivotally mounted within said body and defining an intake passage for receiving a fuel flow therethrough;
   wherein the housing is pivotal within said body from a closed position to an open position to move the intake passage into registration with the fuel intake pipe;
   a pressurization valve that is aligned with the intake passage of the vehicle fuel pipe and is operable when the fuel intake device is in the closed position; and
   a passageway provided in the fuel intake device that allows testing of the pressurization valve.

5. The fuel intake device of claim 4, wherein the body is cylindrical.

6. The fuel intake device of claim 4, wherein the body is formed of metal.

7. The fuel intake device of claim 6, wherein the metal is aluminum.

8. The fuel intake device of claim 4, wherein the body is formed of a corrosion resistant synthetic material.

9. The fuel intake device of claim 4, wherein the body is formed of plastic.

10. The fuel intake device of claim 4, and further comprising a cover pivotally mounted to the vehicle.

11. The fuel intake device of claim 10, wherein the body is positioned within a surface of the vehicle and the cover includes an appearance corresponding to the surface of the vehicle.

12. The fuel intake device of claim 10, wherein the cover is substantially flush with a surface of the vehicle when in the closed position.

13. The fuel intake device of claim 12, wherein the cover includes a lock.

14. The fuel intake device of claim 4, wherein the vehicle includes a gas tank connected to the intake pipe for receiving the fuel flow.

15. The fuel intake device of claim 4, wherein the intake passage of the housing is in communication with the fuel intake pipe when the housing is in its open position and is not in communication when in its closed position.

16. The fuel intake device of claim 15, wherein the flow passage and housing are capable of receiving a fuel pump nozzle and retaining the nozzle to not allow return of the housing to the closed position during fueling.

17. The fuel intake device of claim 4 wherein the body is removable from the vehicle.

18. The fuel intake device of claim 4 and further including a depressurization valve that is aligned with the fuel intake passage of the vehicle fuel pipe and is operable when the fuel intake device is in the closed position.

19. The fuel intake device of claim 18, wherein a passageway is provided in the fuel intake device that allows testing of the depressurization valve.

20. The fuel intake device of claim 4, wherein the body is threaded.

21. The fuel intake device of claim 20, wherein a series of gaskets can be received over the body to align the fuel intake device upon installation.

22. A replacement fuel intake device for a vehicle comprising:
   a body capable of being received within a fuel intake pipe of the vehicle;
   a housing pivotally mounted within said body and defining an intake passage for receiving a fuel flow therethrough;
   wherein the housing is pivotal within said body from a closed position to an open position to move the intake passage into registration with the fuel intake pipe; and
   a pressurization valve and a depressurization valve aligned with the intake passage of the fuel intake pipe when the fuel intake device is in the closed position, wherein the pressurization valve and the depressurization valve are housed on a removable cap.

23. The fuel intake device of claim 22 wherein the body is threaded.

24. The fuel intake device of claim 22 wherein the body is removable from the vehicle.

25. The fuel intake device of claim 22 further comprising a cover pivotally mounted to the vehicle.

26. The fuel intake device of claim 25 wherein the body is positioned within a surface of the vehicle and the cover includes an appearance corresponding to the surface of the vehicle.

27. The fuel intake device of claim 22, wherein the removable cap is screw-threaded into the body and communicates with a relief passageway.

28. The fuel intake device of claim 22, wherein the removable cap includes indentations that facilitate removal and can be locked into place in an airtight manner.

* * * * *